United States Patent
Torson et al.

(10) Patent No.: US 9,061,843 B2
(45) Date of Patent: Jun. 23, 2015

(54) SYSTEM AND METHOD FOR INTEGRAL PLANNING AND CONTROL OF CONTAINER FLOW OPERATIONS IN CONTAINER TERMINALS

(71) Applicant: Navis LLC, Oakland, CA (US)

(72) Inventors: Andrew Torson, Lafayette, CA (US); Oscar Pernia Fernandez, Walnut Creek, CA (US); John Philip Scattergood, Walnut Creek, CA (US); Joseph Louis Weiner, Alameda, CA (US)

(73) Assignee: Navis LLC, Oakland, CA (US)

( * ) Notice: Subject to any disclaimer, the term of this patent is extended or adjusted under 35 U.S.C. 154(b) by 29 days.

(21) Appl. No.: 14/056,163

(22) Filed: Oct. 17, 2013

(65) Prior Publication Data

US 2015/0112476 A1     Apr. 23, 2015

(51) Int. Cl.
    *G06F 7/00*     (2006.01)
    *B65G 63/00*     (2006.01)

(52) U.S. Cl.
    CPC .................................. *B65G 63/004* (2013.01)

(58) Field of Classification Search
    None
    See application file for complete search history.

(56) References Cited

U.S. PATENT DOCUMENTS

| | | | |
|---|---|---|---|
| 4,973,219 A | 11/1990 | Brickner et al. | |
| 5,951,226 A | 9/1999 | Fantuzzi | |
| 7,344,037 B1 | 3/2008 | Zakula et al. | |
| 7,547,173 B2 | 6/2009 | Jung | |
| 7,753,637 B2 | 7/2010 | Benedict et al. | |
| 7,972,102 B2 | 7/2011 | Ward et al. | |
| 7,987,017 B2 * | 7/2011 | Buzzoni et al. | 700/213 |
| 8,087,867 B2 | 1/2012 | Tian | |
| 8,118,534 B2 | 2/2012 | Amoss et al. | |
| 8,225,948 B2 | 7/2012 | De Jong et al. | |
| 8,306,649 B2 | 11/2012 | Buzzoni et al. | |
| 8,376,658 B2 | 2/2013 | Zanovello et al. | |
| 2005/0075899 A1 | 4/2005 | Corcoran et al. | |
| 2006/0220851 A1 * | 10/2006 | Wisherd | 340/568.1 |

FOREIGN PATENT DOCUMENTS

| | | |
|---|---|---|
| CN | 101350138 | 1/2009 |
| WO | 2003087890 | 10/2003 |

\* cited by examiner

*Primary Examiner* — Yolanda Cumbess
(74) *Attorney, Agent, or Firm* — Reinhart Boerner Van Deuren s.c.

(57) ABSTRACT

A system and method for automatically planning and controlling container flow operations in a large-scale container terminal shipping container transportation and storage terminals such as those at ports is disclosed. The system and method automatically scheduling operations of the container terminal in a holistic manner in multiple different time windows in advance in which operations are scheduled in a far-ahead horizon time window, in a candidate horizon time window, and in an imminent horizon time window.

20 Claims, 13 Drawing Sheets

SYSTEM AND METHOD FOR INTEGRAL PLANNING AND CONTROL OF CONTAINER FLOW OPERATIONS IN CONTAINER TERMINALS

BACKGROUND OF THE INVENTION

Field of the Invention

The present invention relates generally to shipping container transportation and storage terminals such as those at ports at which cargo is transferred between ocean-going ships and land transportation such as trucks and trains, and more particularly to a system and method for automatically planning and controlling container flow operations in a large-scale container terminal.

Import and export of goods between countries that are not connected by land are done by sea transport, with sea transport also serving as the preferred mode of transportation between areas in the same country that are better served by sea transport than by land transport, with the interface between ships at a port and land transportation at the port being accomplished at large shipping container transportation and storage terminals. Most goods being shipped are packed into large containers of one or more International Standards Organization ("ISO") standardized sizes, all with a standard width of eight feet, with the vast majority of such containers being 20 foot long containers (one "twenty-foot equivalent unit", or TEU) or 40 foot long containers (two TEU). Some such containers are specialized for the particular cargo they are used to transport, such as refrigerated containers for perishable goods, tank containers for liquids, and car containers for transporting automobiles.

Such standardized containers are transported at sea by large container transporting ships, and by land with trucks or trains. Given the magnitude of international and intra-national shipping by sea, it will be appreciated that the size and scale of large shipping container transportation and storage terminals located at ports is tremendous, with a high volume of shipping containers arriving at such shipping container transportation and storage terminals by ship, truck, and train. While some of the shipping containers will be rapidly transferred through the shipping container transportation and storage terminals, other shipping containers must be temporarily stored for some period following their arrival and prior to their departure.

Large shipping container transportation and storage container terminals may be thought of as having three essential elements: a waterside port interface where shipping containers are loaded onto and unloaded from ships at a port, a landside land transportation interface where shipping containers are loaded onto and unloaded from trucks and trains, and a shipping container transportation and storage region or yard (also known as the deck) located between the port interface and the land transportation interface. In this regard, such container terminals can be thought of as a system having load/unload, transfer, storage, and receiving/delivery subsystems.

The shipping container transportation and storage region includes multiple yard blocks, each of which includes a large number of shipping containers that are temporarily stored in longitudinal orientations in the yard block. Such yard blocks may be, for example, approximately 40 storage containers long, eight storage containers wide, and storage containers may be stacked up to five storage containers high. Each yard block is typically served by two automatic stacking cranes ("ASC's"), namely a water-side stacking crane and a land-side stacking crane, sometimes referred to as automated rail-mounted gantry cranes ("ARMG's"), that move on tracks located on opposite sides of the yard block, and can transport and store containers between the port interface and the land transportation interface. Other types of ARMG's may also be used, such as cross-over ARMG's, for example.

The port interface includes quay cranes ("QC's," including both quay cranes with automated portal trolleys and quay cranes with semi-automatic main trolleys) that load storage containers onto and unload storage containers from ships at the port, and automated horizontal transport ("AHT") that transport containers between the quay cranes and the port end of the yard blocks. Automated horizontal transport includes automated vehicles such as automated shuttle carriers ("ASH's") and automated guided vehicles ("AGV's"), which can transport either one or two storage containers, as well as any other types of automated vehicles used in shipping container transportation and storage terminals. The land transportation interface includes truck gates and loading zones at the land transportation end of the yard blocks, as well as train loading zones and automated horizontal transport that transport containers between the quay cranes and the train loading zones. The automated horizontal transport are robotic, unmanned vehicles that are used to shuttle shipping containers short distances from point to point.

As may be expected, there have been a number of attempts to facilitate the operation of such a large shipping container transportation and storage terminal. For example, U.S. Pat. No. 7,972,102, to Ward et al., provides a good general description of the operation of an automated stacking crane and automated horizontal transport, and U.S. Pat. No. 8,118,534, to Amoss et al., provides a good description of the operation of a quay crane. U.S. Pat. Nos. 7,972,102 and 8,118,534 are hereby incorporated herein by reference in their entirety. Other patents useful as background to the construction and operation of large shipping container transportation and storage terminals are U.S. Pat. No. 8,376,658, to Zanovello et al.; U.S. Pat. No. 8,306,649, to Buzzoni et al.; U.S. Pat. No. 8,225,946, to De Jong et al.; U.S. Pat. No. 8,087,867, to Tian; U.S. Pat. No. 7,547,173, to Jung; U.S. Pat. No. 5,951,226, to Fantuzzi; and U.S. Pat. No. 4,973,219, to Brickner et al., all seven of which are hereby incorporated herein by reference in their entirety.

Container flow operations in a large shipping container transportation and storage terminal span waterside, the yard, and landside, and may be fully automated (robotic) if the yard and the horizontal transportation are robotic, semi-automated (robotic but with human operators present to observe each robotic component) if the yard is robotic but the horizontal transportation is manual (operated by drivers), or partially automated with some operations performed by machines (process automation, cargo handling equipment ("CHE"), and container position and identification detection), but with human operators actively controlling each and following automatically dispatched commands received via a radio data terminal ("RDT") device. Current state-of-the-art shipping container transportation and storage terminal operations practice controls such processes independently, absent any significant degree of advance planning for most of these processes and also absent the ability to change plans in real-time due to the intermittent and variable nature of the operations, as well as being unable to benefit from last-minute optimization opportunities.

The subject matter discussed in this background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

SUMMARY OF THE INVENTION

The present invention supports a system for and a method of managing the operation of a shipping container transportation and storage terminal that exhibits integral and overall planning and control of container flow operations, while seamlessly combining both advance planning and real-time operations scheduling steps for all of the key container flow sub-processes involved and also leveraging and improving existing methodologies and practices in each of the underlying processes. This is based upon a realization that shipping container transportation and storage terminals are in fact more predictable than previously believed, and are thus potentially significantly better schedulable than are current shipping container transportation and storage terminal operations on event horizons of one to two hours ahead of actual execution. The scheduling function of the integral container terminal flow planning and control system and method of the present invention may be thought of as determining and optimizing the gap between planning (containers coming in and going out) and holistic execution of the entire process.

The integral container terminal flow planning and control system and method of the present invention provides tighter and holistic integration of the key planning and control processes, including ship, truck, and rail planning, real-time container deck position assignments, and the container handling equipment control required to support it. As such, the integral container terminal flow planning and control system and method of the present invention has a lesser impact of human dispatchers and planners on robotic operations, which are fully automated, and remote semi-autonomous machine operations, which are partially automated with a human operator present at the machine as necessary (and sometimes mandated by preexisting labor contracts).

In a system embodiment, a system for planning and controlling container flow operations in a container terminal having: at least one yard block adapted to store containers, each yard block extending between a quay side of the yard block and a land transport side of the yard block; two automated stacking cranes per each yard block on rails adapted to allow the automated stacking cranes to travel between the quay side and the land transport side of each yard block, the automated stacking cranes adapted to transport containers between the quay side and the land transport side of each yard block and to store containers in each yard block; at least one quay crane adapted to transfer containers onto and off of a ship; a plurality of automated vehicles adapted to transport containers between the quay side of the at least one yard block and the quay crane and between the land transport side of the at least one yard block and rail transport; wherein the planning and controlling system comprises: at least one processor device; a first database adapted to store information relating to an identity and a location of each of the containers stored in the at least one yard block; a second database adapted to store information relating to containers arriving at the container terminal; a third database adapted to store information relating to containers departing from the container terminal; an automatic holistic scheduler operatively connected to and adapted to obtain information from the first, second, and third databases, the automatic holistic scheduler also being adapted to direct sequential operations of each quay crane to transfer containers onto and off of a ship, to direct sequential operations of the stacking cranes to transport containers between the quay side and the land transport side of each yard block and to store containers in the at least one yard block, and to direct sequential operations of the automated vehicles to transport containers between the quay side of the at least one yard block and the quay crane and between the land transport side of the at least one yard block and rail transport; wherein the automatic holistic scheduler is arranged to automatically schedule operations of the container terminal in at least three different time windows in advance including, in order from longest time window to shortest time window: a first group of operations in a far-ahead horizon time window; a second group of operations in a candidate horizon time window; and a third group of operations in an imminent horizon time window; and wherein the at least one processor device is operatively connected to at least one of the first database, the second database, the third database, and the automatic holistic scheduler.

In another system embodiment, a system for planning and controlling container flow operations in a container terminal having: at least one yard block adapted to store containers, each yard block extending between a quay side of the yard block and a land transport side of the yard block; two automated stacking cranes per each yard block on rails adapted to allow the automated stacking cranes to travel between the quay side and the land transport side of each yard block, the automated stacking cranes adapted to transport containers between the quay side and the land transport side of each yard block and to store containers in each yard block; at least one quay crane adapted to transfer containers onto and off of a ship; and a plurality of automated vehicles adapted to transport containers between the quay side of the at least one yard block and the quay crane and between the land transport side of the at least one yard block and rail transport; wherein the planning and controlling system comprises: at least one processor device; a first database adapted to store information relating to an identity and a location of each of the containers stored in the at least one yard block; a second database adapted to store information relating to containers arriving at the container terminal; a third database adapted to store information relating to containers departing from the container terminal; a quay crane scheduling module arranged to direct sequential operations of each quay crane to transfer containers onto and off of a ship; a stacking crane scheduling module arranged to direct sequential operations of the stacking cranes to transport containers between the quay side and the land transport side of each yard block and to store containers in the at least one yard block; a horizontal transport scheduling module arranged to direct sequential operations of the automated vehicles to transport containers between the quay side of the at least one yard block and the quay crane and between the land transport side of the at least one yard block and rail transport; a holistic scheduling module operatively connected to and adapted to obtain information from the first, second, and third databases, the holistic scheduling module also being adapted to direct the operations of the quay crane scheduling module, the stacking crane scheduling module, and the horizontal transport scheduling module; wherein the holistic scheduling module is arranged to automatically schedule operations of the container terminal in at least three different time windows in advance including, in order from longest time window to shortest time window: a first group of operations in a far-ahead horizon time window; a second group of operations in a candidate horizon time window; and a third group of operations in an imminent horizon time window; and wherein the at least one processor device is operatively connected to at least one of the first database, the second database, the third database, the quay crane scheduling module, the stacking crane scheduling module, the horizontal transport scheduling module, and the holistic scheduling module.

In yet another system embodiment, a system for planning and controlling container flow operations in a container terminal having: a yard block adapted to store containers, the yard block extending between a quay side of the yard block and a land transport side of the yard block; two automated stacking cranes on rails adapted to allow the automated stacking cranes to travel between the quay side and the land transport side of each yard block and to transport containers between the quay side and the land transport side of the yard block and to store containers in the yard block; a quay crane adapted to transfer containers onto and off of a ship; and automated vehicles adapted to transport containers between the quay side of the yard block and the quay crane and between the land transport side of the yard block and rail transport; wherein the planning and controlling system comprises: a processor device; at least one database adapted to store information relating to an identity and a location of each of the containers stored in the at least one yard block, information relating to containers arriving at the container terminal, and information relating to containers departing from the container terminal; and an automatic holistic scheduler adapted to direct sequential operations of the quay crane to transfer containers onto and off of a ship, the stacking cranes to transport containers between the quay side and the land transport side of the yard block and to store containers in the yard block, and the automated vehicles to transport containers between the quay side of the yard block and the quay crane and between the land transport side of the yard block and rail transport, wherein the automatic holistic scheduler is operatively connected to the first, second, and third databases; and wherein the automatic holistic scheduler is adapted to automatically schedule operations of the container terminal in at least three time windows; and wherein the processor device is operatively connected to at least one of the first database, the second database, the third database, and the automatic holistic scheduler.

In a method embodiment, a method for planning and controlling container flow operations in a container terminal includes: storing information relating to an identity and a location of each of a plurality of containers stored in at least one yard block in a first database, wherein the at least one yard block is adapted to store containers, and wherein each yard block extends between a quay side of the yard block and a land transport side of the yard block; storing information relating to containers arriving at the container terminal in a second database; storing information relating to containers departing from the container terminal in a third database; directing sequential operations of at least one quay crane to transfer containers onto and off of a waterborne vessel with a quay crane scheduling module, wherein each quay crane is adapted to transfer containers onto and off of a ship; directing sequential operations of a plurality of stacking cranes to transport containers between the quay side and the land transport side of each yard block and to store containers in the at least one yard block with a stacking crane scheduling module, wherein each yard block has two automated stacking cranes on rails adapted to allow the automated stacking cranes to travel between the quay side and the land transport side of each yard block, and wherein the automated stacking cranes are adapted to transport containers between the quay side and the land transport side of each yard block and to store containers in each yard block; directing sequential operations of a plurality of automated vehicles adapted to transport containers between the quay side of the at least one yard block and the quay crane and between the land transport side of the at least one yard block and rail transport with a horizontal transport scheduling module; obtaining information from the first, second, and third databases and directing the operations of the quay crane scheduling module, the stacking crane scheduling module, and the horizontal transport scheduling module with a holistic scheduling module; automatically scheduling operations of the container terminal in at least three different time windows in advance including, in order from longest time window to shortest time window: a first group of operations in a far-ahead horizon time window; a second group of operations in a candidate horizon time window; and a third group of operations in an imminent horizon time window; and wherein at least one processor device is operatively connected to at least one of the first database, the second database, the third database, the quay crane scheduling module, the stacking crane scheduling module, the horizontal transport scheduling module, and the holistic scheduling module.

The integral container terminal flow planning and control system and method of the present invention provides a system and method to automatically plan and control of container flow operations in a container terminal. The integral container terminal flow planning and control system and method of the present invention does so holistically in a plurality of time periods prior to the actual execution of container moves. Finally, the integral container terminal flow planning and control system and method of the present invention achieves numerous advantages without incurring any substantial relative disadvantage.

DESCRIPTION OF THE DRAWINGS

These and other advantages of the present invention are best understood with reference to the drawings, in which.

DETAILED DESCRIPTION OF AN EXEMPLARY EMBODIMENT

Figure 1:
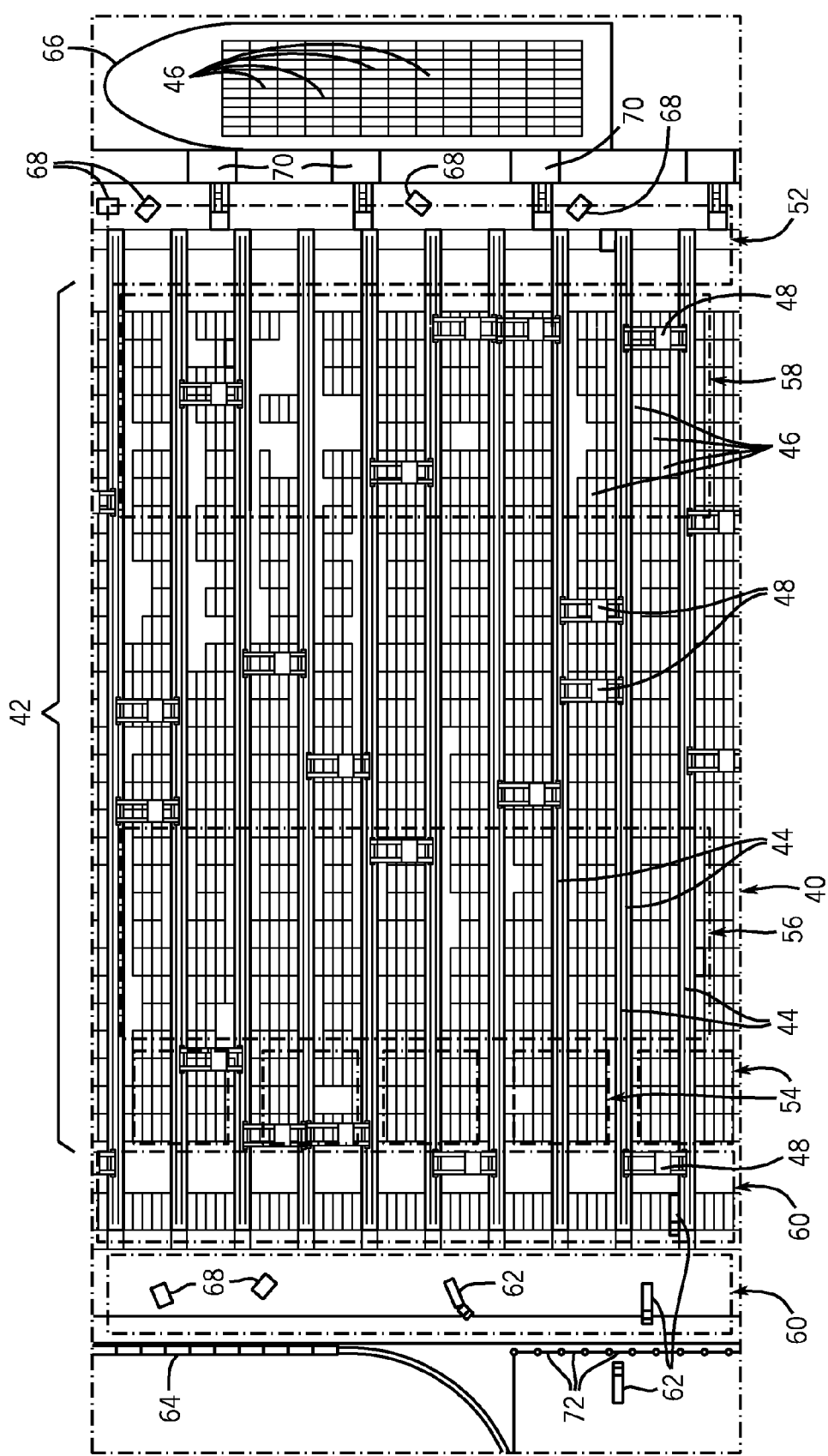
FIG. 1 is a simplified schematic plan view of a portion of an exemplary shipping container transportation and storage terminal located intermediate ocean-going ships and truck and train land transportation.

Prior to discussing the construction and operation of an exemplary embodiment of the integral container terminal flow planning and control system and method of the present invention, it is useful to provide a brief discussion of the various components that will be operated by the integral container terminal flow planning and control system. Referring first to FIG. 1, a portion of a container terminal 40 is depicted in a simplified plan view. Located in the center of FIG. 1 is a plurality of yard blocks indicated generally by the reference numeral which each 42 extend from left to right as shown in FIG. 1.

The yard blocks 42 are each located between a pair of rails 44, with each yard block 42 providing room for a large number of containers 46 located between the rails. For example, the containers 46 may be placed in longitudinal arrays ten wide and five or six high, with only the length of the yard blocks 42 limiting the number of containers 46 is a single yard block 42. This configuration will use end-loading automated stacking cranes (to be discussed below) and what may be thought of as a perpendicular configuration. Each of the yard blocks 42 has a pair of automated stacking cranes 48 running on the pair of rails 44.

The yard blocks 42 are located between a truck/train transfer lane 50 on the land transfer side (shown on the left of the yard blocks 42 in FIG. 1) and a transfer lane 52 on the quay side (shown on the right of the yard blocks 42 in FIG. 1). The yard blocks 42 include reefer racks 54 and then an import storage zone 56 adjacent the truck/train transfer lane 50, and an export storage zone 58 adjacent the transfer lane 52. Located on the side of the truck/train transfer lane 50 opposite the yard blocks 42 is a queuing space 60.

The reefer racks 54 are used for storage of refrigerated containers 46 (which require an electrical power source to keep them cold). The import storage zone 56 is generally used for temporary storage of containers 46 arriving at the container terminal 40 from trucks 62 or trains 64. The export storage zone 58 is generally used for temporary storage of containers 46 arriving at the container terminal 40 from ships 66.

In addition, a number of automated horizontal transports 68 are used in both the transfer lane 52 and in the portion of the queuing space 60 intermediate the truck/train transfer lane 50 and the trains 64. The automated horizontal transports 68 are mobile platforms that fill the role of a terminal truck. Exchanges of containers 46 with automated stacking cranes 48 at transfer may be synchronous and/or asynchronous (using racks or direct transfer or both), and exchanges of containers 46 with the quay cranes 70 are always synchronous. The automated horizontal transports 68 each have their own onboard navigation system, while the control system for the container terminal 40 will manage the traffic of the entire fleet of the automated horizontal transports 68.

The automated horizontal transports 68 in the transfer lane 52 are used to transfer containers 46 between the automated stacking cranes 48 at the quay side of the yard blocks 42 and quay cranes 70 that load and unload containers 46 onto and off of the ships 66. The automated horizontal transports 68 in the queuing space 60 are used to transfer containers 46 between the automated stacking cranes 48 at the land transport side of the yard blocks 42 and the trains 64. Although they are not shown in FIG. 1, cranes located near the trains 64 may be used to load and unload containers 46 onto and off of the trains 64. The trucks 62 are allowed into the queuing space 60 and leave the queuing space 60 through a series of numbered gates 72.

Figure 2:
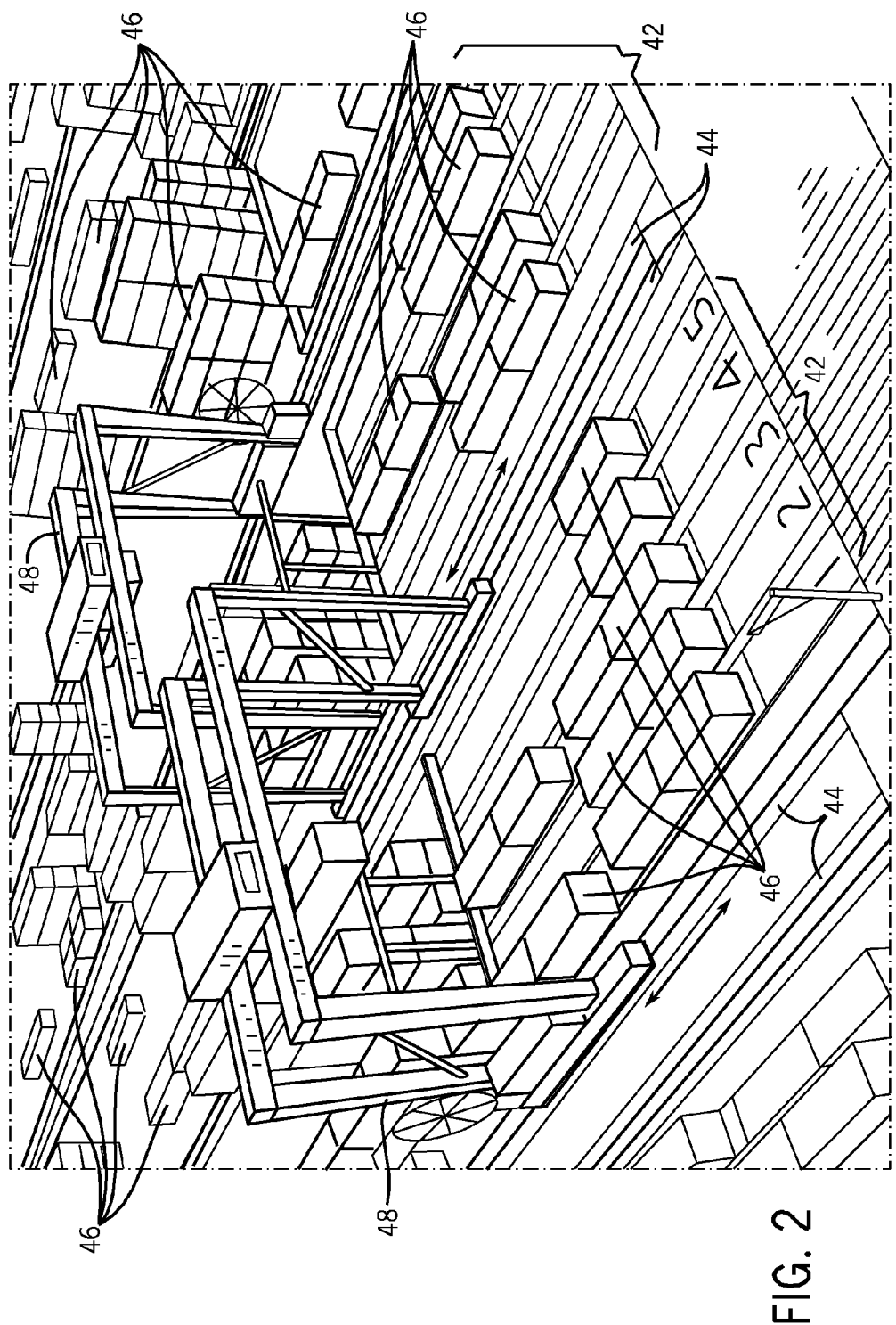
FIG. 2 is an isometric view of a portion of the shipping container transportation and storage terminal shown in FIG. 1, showing automated stacking cranes located at the quay side of yard block for storing containers in the shipping container transportation and storage terminal.

Referring next to FIG. 2, two of the yard blocks 42 that are each located on a pair of rails 44 are shown near the quay side of the yard blocks 42. It will be appreciated that containers 46 to be transferred to a ship 66 (shown in FIG. 1) are brought from the yard blocks 42 to the transfer lane 52 (also best shown in FIG. 1), where they will be picked up and transferred to the quay cranes 70 (also shown in FIG. 1) by the automated horizontal transports 68 (also shown in FIG. 1). Likewise, it will be appreciated that containers 46 to be transferred from the ship 66 are brought from the quay cranes 70 by the automated horizontal transports 68 to the transfer lane 52 at the quay side of the yard blocks 42, where they will be picked up by the automated stacking cranes 48.

Figure 3:
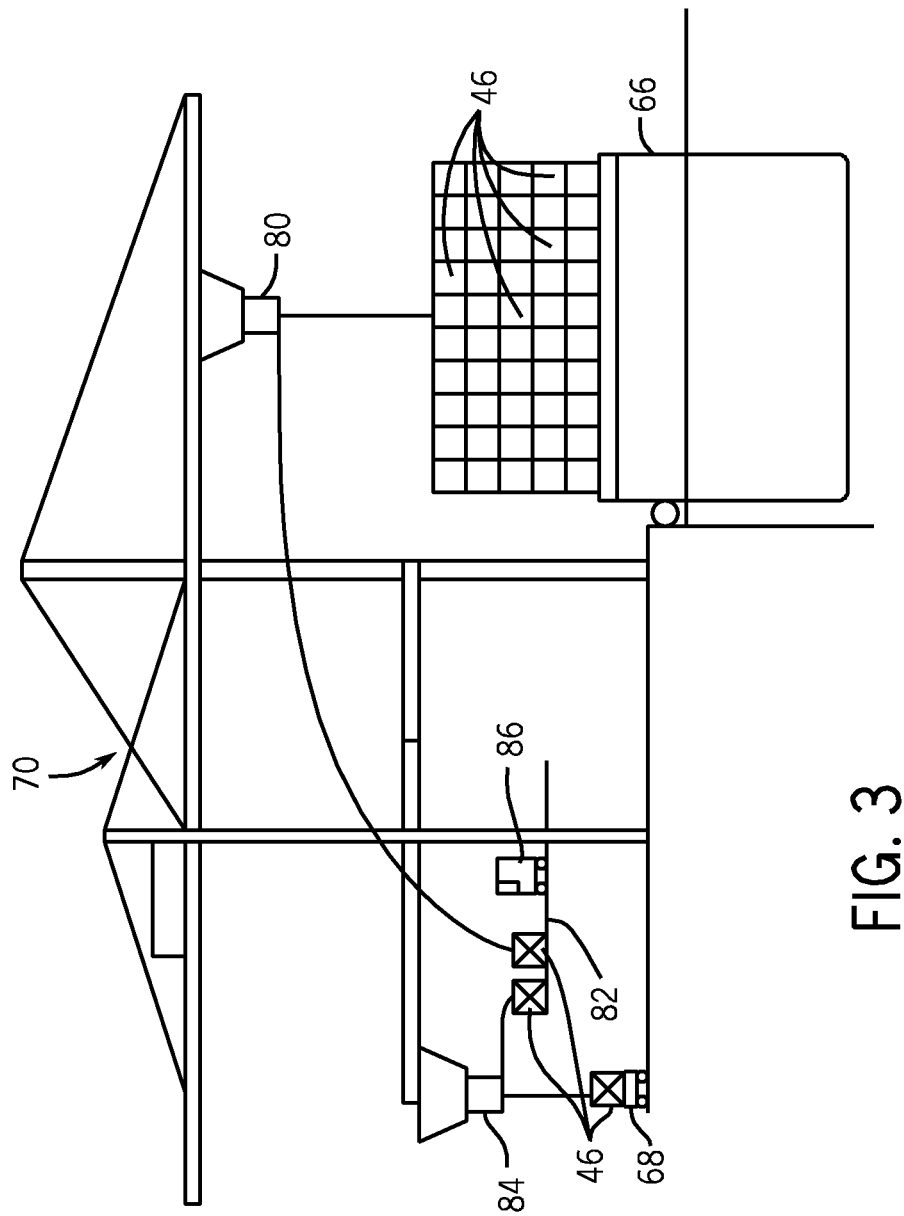
FIG. 3 is an isometric view of a portion of the shipping container transportation and storage terminal shown in FIG. 1, showing quay cranes moving shipping containers between a ship and an automated horizontal transport.

Referring now to FIG. 3, a quay crane 70 used to transfer the containers 46 between the transfer lane 52 adjacent the quay side of the yard blocks 42 (shown in FIGS. 1 and 2) and the ships 66. The quay crane 70 includes a main trolley and hoist 80 for moving containers 46 between the ship 66 and an elevated platform 82 on the quay cranes 70. The quay cranes 70 also includes a portal trolley and hoist 84 for moving containers 46 between the elevated platform on the quay cranes 70 and the automated horizontal transports 68 located in the transfer lane 52 (shown in FIG. 1).

The main trolley and hoist 80 is typically a semi-automatic trolley in which a quay crane driver calibrates the main trolley and hoist 80 over a bay of the ship 66 for a first move, with subsequent moves to the same onboard stack being automatically driven by the main trolley and hoist 80. The containers 46 can be automatically transferred the portal trolley and hoist 84 and an automated horizontal transport 68. The main trolley and hoist 80 and the portal trolley and hoist 82 can be operated together to automatically move the containers 46 between the ships 66 and the automated horizontal transports 68.

The quay crane 70 may also have an automatic optical character recognition ("OCR") assembly 86 to automatically read container numbers and, potentially, other information located on the containers 46 as they are placed onto the elevated platform 82. Optionally, a person may also be deployed on the quay cranes 70 at the elevated platform 82 or in another location if necessary. Additionally, the OCR process may also take place while the containers 46 are being moved by the main trolley and hoist 80 or the elevated platform 82 by installing the OCR reader onto the lifting portion of the main trolley and hoist 80 or the elevated platform 82.

Figure 4:
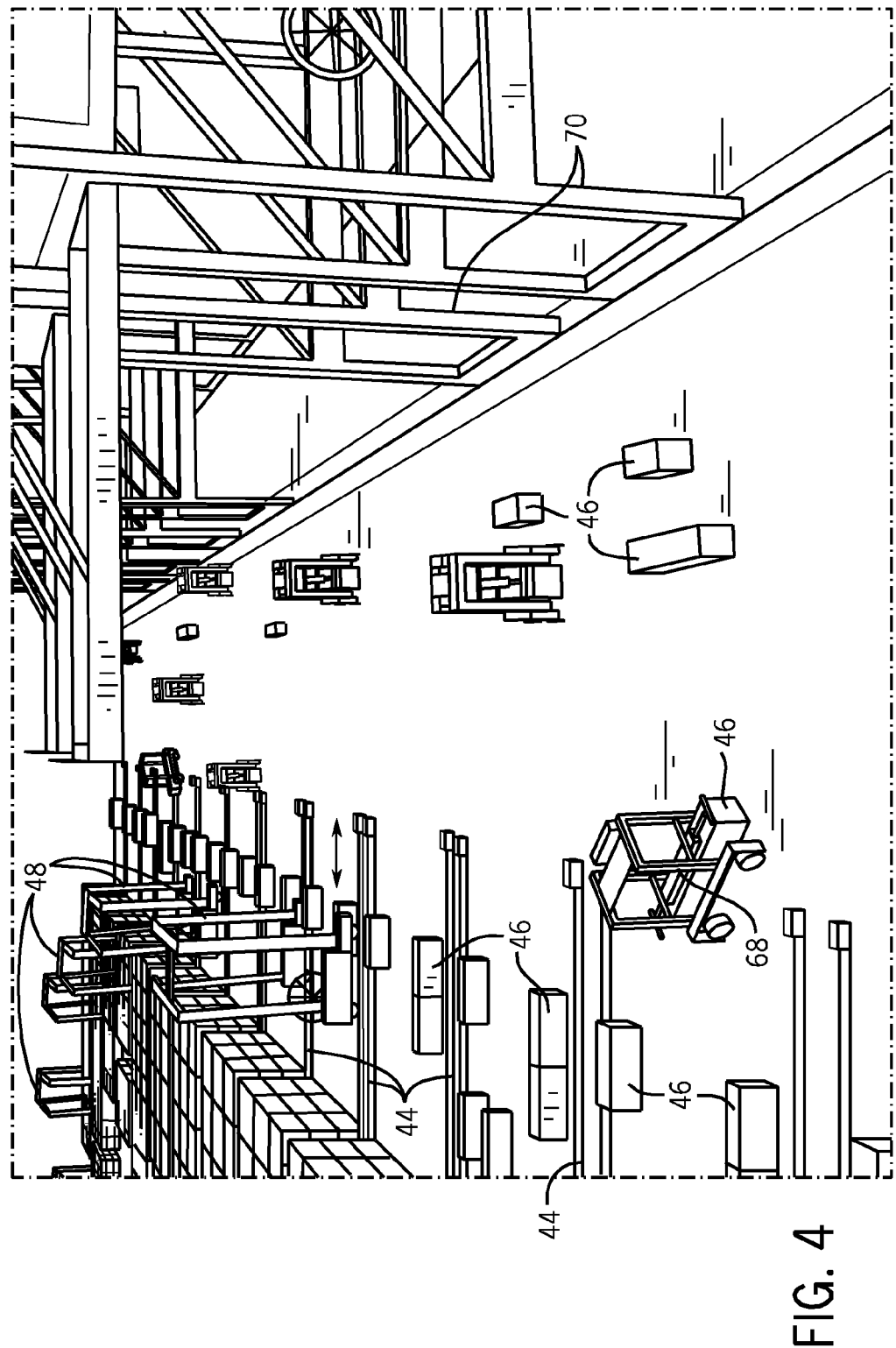
FIG. 4 is an isometric view of a portion of the shipping container transportation and storage terminal shown in FIG. 1, showing automated horizontal transport moving between quay cranes and the quay side of the shipping container transportation and storage terminal.

Referring next to FIG. 4, a number of the automated horizontal transports 68 are shown transporting the containers 46 between the quay cranes 70 and the automated stacking cranes 48 at the quay side of the yard blocks 42. The automated horizontal transports 68 shown are automated shuttle carriers ("ASC's") that are 1-over-1 (lift one container over one container), which are commonly used. While they typically carry containers 46 between automated stacking cranes 48 and quay cranes 70 exchange areas, they can also directly manage 1-high straddle-type stacking areas if desired. Also commonly used are automated horizontal transports 68 that are 1-over-2 (lift one container over two containers) that can handle three-high storage areas. They also periodically need to make drives that are unrelated to container handling, such as for refueling and maintenance area access, or to a parking area if they are not needed.

Figure 5:
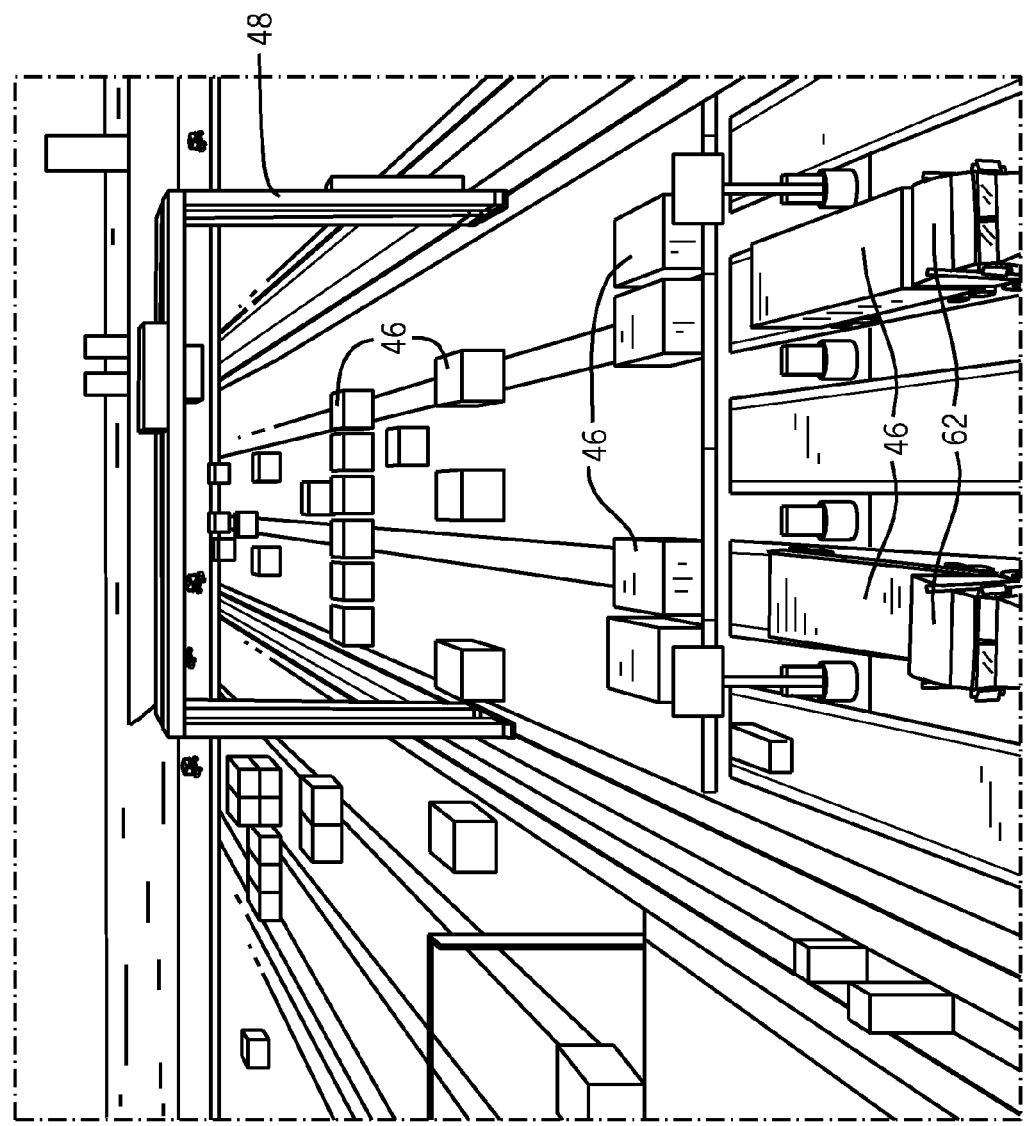
FIG. 5 is an isometric view of a portion of the shipping container transportation and storage terminal shown in FIG. 1, showing trucks in a position to transfer cargo to or receive cargo transferred from automated stacking cranes at the truck and train transfer lanes that are located at the land transfer side of the yard block for storing containers in the shipping container transportation and storage terminal.

Referring now to FIG. 5, two trucks 62 are shown parked in the queuing space 60 (shown in FIG. 1) at the land transfer side of one of the yard blocks 42. The automated stacking crane 48 in that the yard block 42 (shown in FIG. 1) will be used to either unload containers 46 from the trucks 62 or load containers 46 onto the trucks 62. A person is generally used to assist in the final landing of the containers 46 onto the trucks 62 or to assist in the lifting of the containers 46 from the trucks 62. Although they are not shown in FIG. 5, it will be appreciated that the automated horizontal transports 68 are also used at the land transfer side of the yard blocks 42 to transport containers 46 between the automated stacking cranes 48 and the train 64 (shown in FIG. 1). Optionally, the automated horizontal transports 68 may also be used at the land transfer side of the yard blocks 42 to transport containers 46 between the automated stacking cranes 48 and an interchange area where trucks 62 deliver and receive containers 46.

Figure 6:
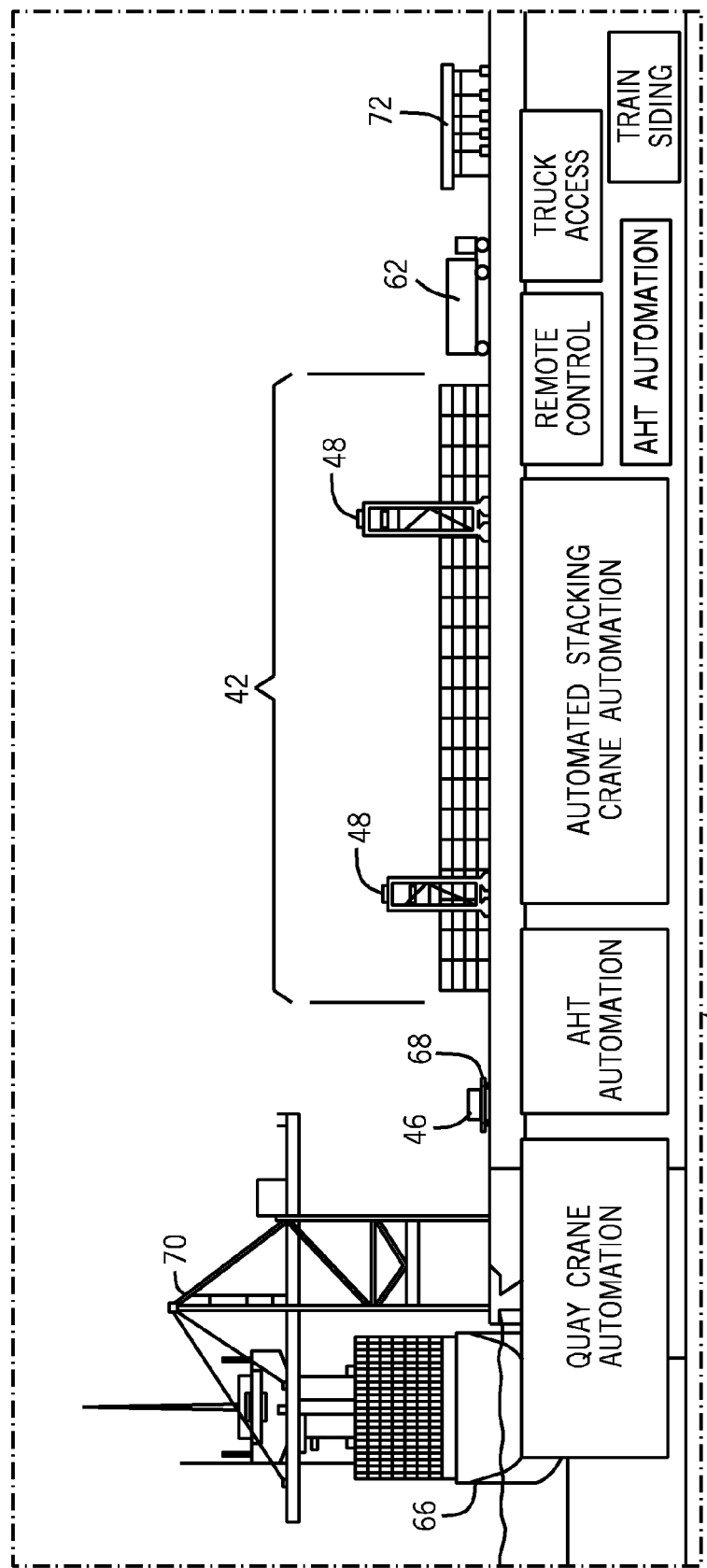
FIG. 6 is a schematic side view showing a portion of the shipping container transportation and storage terminal shown in FIG. 1, and the various elements shown in FIGS. 2 through 5, schematically illustrating the automation of the transfer of cargo between a ship, storage areas serviced by an automated stacking crane, and truck and train transfer areas.

Referring next to FIG. 6, the degree of automation of the transfer of containers 46 between a ship 66 using a quay crane 70, automated horizontal transports 68, yard blocks 42 serviced by an automated stacking crane 48, and truck and train transfer areas. Remote operators may be (and often are) used to operate the quay cranes 70.

Figure 7:
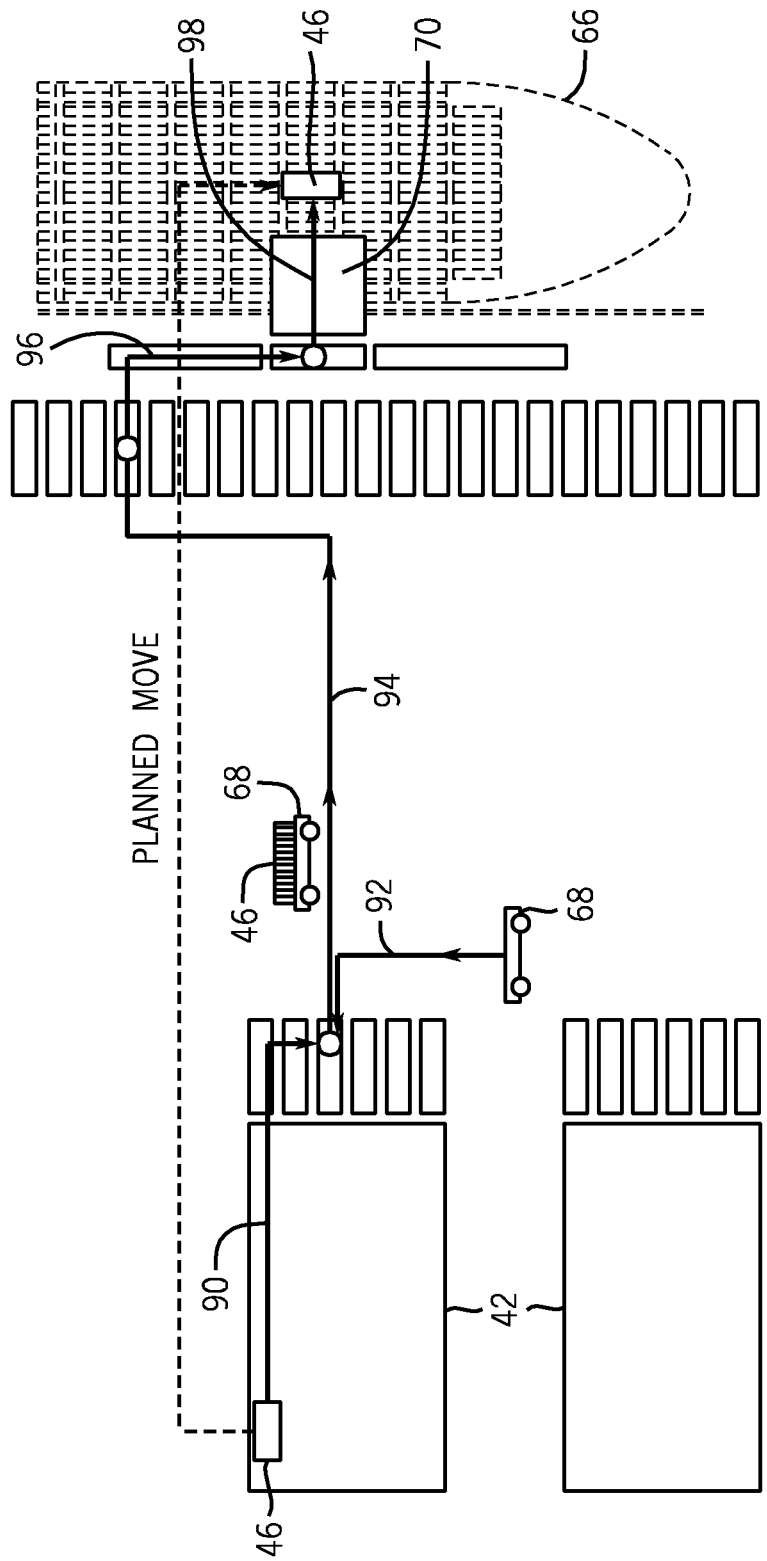
FIG. 7 is a schematic plan view showing the transfer by automated horizontal transport of cargo containers from a yard block serviced by an automated stacking crane to a quay crane and subsequently loaded onto a ship.
Figure 8:
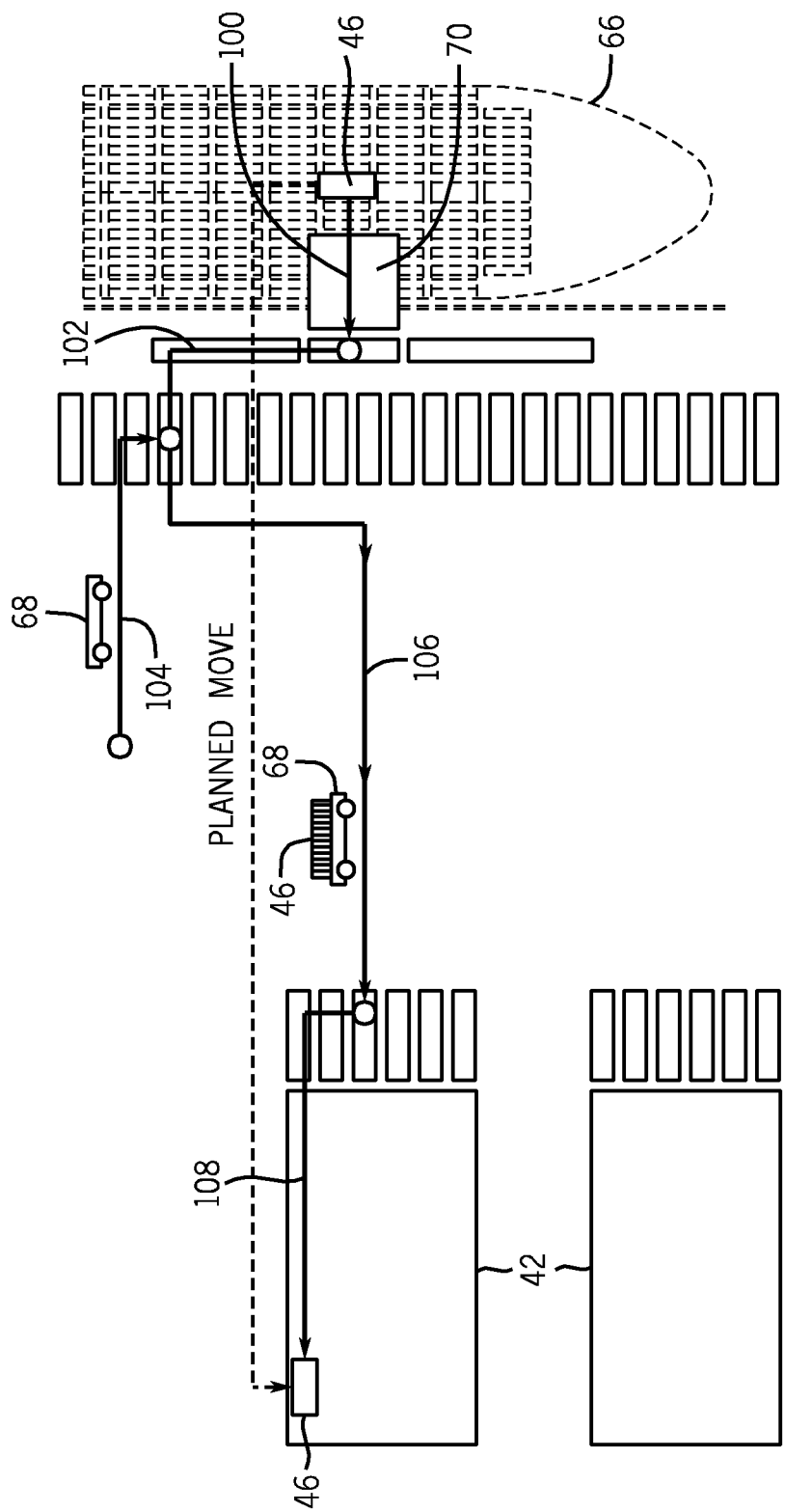
FIG. 8 is a schematic plan view showing the transfer of cargo containers offloaded from a ship using an automated stacking crane by automated horizontal transport to a storage area serviced by an automated stacking crane.

Referring now to FIGS. 7 and 8, examples of the execution of planned moves of a container 46 from a yard block 42 to a ship 66 and of a container 46 from a ship 66 to a yard block 42, respectively, is shown. Referring first to FIGS. 1 and 3 in addition to FIG. 7, the container 46 from the yard block 42 is to be moved to the ship 66 in five steps. In a first step 90, the container 46 is moved (using an automated stacking crane 48 (shown in FIG. 1)) from its location in the yard block 42 to a position at the quay side of the yard block 42. In a second step 92, an automated horizontal transport 68 is moved to a position over the container 46 to pick it up for transport.

In a third step 94, the automated horizontal transports 68 carries the container 46 to a position adjacent the quay crane 70 (where the automated horizontal transports 68 places the container 46 on the ground, following which the automated horizontal transports 68 leaves). In a fourth step 96, the portal trolley and hoist 84 (shown in FIG. 3) of the quay crane 70 picks up the container 46 and places it on the elevated platform 82 (shown in FIG. 3) of the quay crane 70. In a fifth step, the main trolley and hoist 80 (shown in FIG. 3) of the quay crane 70 picks up the container 46 from the elevated platform 82 and places it in a desired position on the ship 66.

Referring now to FIGS. 1 and 3 in addition to FIG. 8, the container 46 on the ship 66 is to be moved to a desired storage position in the yard block 42 in five steps. In a first step 100, the main trolley and hoist 80 (shown in FIG. 3) of the quay crane 70 picks up the container 46 from its position on the ship 66 and places it on the elevated platform 82 (shown in FIG. 3) of the quay crane 70. In a second step 102, the portal trolley and hoist 84 (shown in FIG. 3) of the quay crane 70 picks up the container 46 from the elevated platform 82 and places it in a position on the ground adjacent the quay crane 70.

In a third step 104, an automated horizontal transport 68 is moved to a position over the container 46 to pick it up for transport. In a fourth step 104, the automated horizontal transport 68 carries the container 46 to a position at the quay side of the yard block 42. In a fifth step 108, the container 46 is moved (using an automated stacking crane 48 (shown in FIG. 1)) from its position at the quay side of the yard block 42 to a desired location in the yard block 42.

Figure 9:
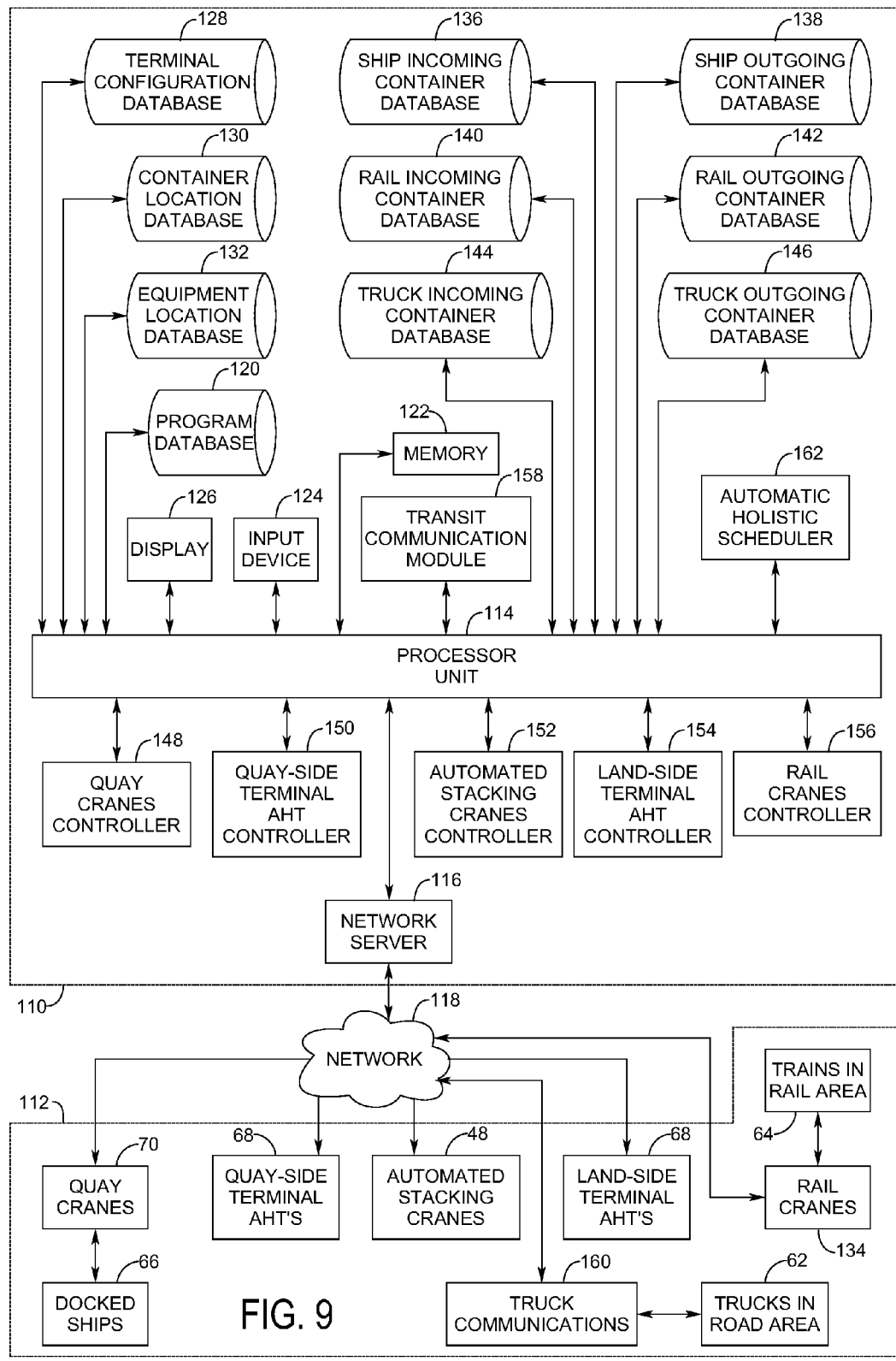
FIG. 9 is a somewhat schematic block diagram showing an overview of an exemplary system that may be used by the integral container terminal flow planning and control system and method of the present invention to operate the shipping container transportation and storage terminal illustrated in FIGS. 1 through 8.

Referring next to FIG. 9, an exemplary embodiment of the integral container terminal flow planning and control system and method of the present invention may be provided by the system illustrated in schematic block diagram fashion in FIG. 1, which shows a container flow planning and control system 110 and the elements of a container terminal 112. The container terminal 112 includes a number of the elements discussed above with reference particularly to FIG. 1, including the automated stacking cranes 48, the trucks 62, the trains 64, the ships 66, the automated horizontal transports 68, and the quay cranes 70, as well as other elements that will be discussed below. The integral container terminal flow planning and control system includes a processor unit 114 to which a variety of system hardware and system modules are operatively interconnected. The processor unit 114 is connected via a network server 116 to a network 118, which operationally links the container flow planning and control system 110 to the container terminal 112, and which may be wired or wireless or wired in part and wireless in part.

A program database 120 is operatively interconnected to the processor unit 114 to store software used by the container flow planning and control system 110 that is not stored in firmware. A memory 122 is also operatively interconnected to the processor unit 114 to store transient information used by the container flow planning and control system 110. An input device 124 is operatively interconnected to the processor unit 114 to provide operator inputs to the container flow planning and control system 110, and can include, for example, a keyboard and a mouse. A display 126 is also operatively interconnected to the processor unit 114 for use by the operator.

The container flow planning and control system 110 includes several components that characterize the container terminal 112, each of which is operatively interconnected to the processor unit 114. A terminal configuration database 128 contains information defining the configuration of the container terminal 112, such as the numbers, sizes, and locations of the yard blocks 42 (shown in FIG. 1) and the various operational elements of the container terminal 112. A container location database 130 contains information as to the identification of and the location of each of the containers 46 stored in the container terminal 112. An equipment location database 132 contains information as to the location of each of the components in the container terminal 112, including the automated stacking cranes 48, the trucks 62, the trains 64, the ships 66, the automated horizontal transports 68, and the quay cranes 70, as well as any rail cranes 134 used to transfer containers 46 between trains 64 and the automated horizontal transports 68.

The container flow planning and control system 110 also includes a number of databases with information regarding incoming and outgoing containers 46, each of which is operatively interconnected to the processor unit 114. A ships incoming container database 136 contains information as to all containers 46 coming in on all ships 66 that identifies each container 46 as well as the exact location of that container 46 on each ship 66. A ships outgoing container database 138 contains information as to all containers 46 going out on ships 66 that identifies both all containers 46 to be placed onto each ship 66 as well as the exact location of each container 46 on each ship 66.

A rail incoming container database 140 contains information as to all containers 46 coming in on all trains 64 that identifies both each container 46 as well as the exact location of that container 46 on each train 64. A rail outgoing container database 142 contains information as to all containers 46 going out on trains 64 that identifies both all containers 46 to be placed onto each train 64 as well as the exact location of each container 46 on each train 64.

A truck incoming container database 144 contains information as to all containers 46 coming in on all trucks 62 that identifies both each container 46 as well as the truck 62 that that container 46 is on. A truck outgoing container database 146 contains information as to all containers 46 going out on trucks 62 that identifies both all containers 46 to be placed onto all trucks 62 as well as the truck 62 that that container 46 is to be placed on. All of the databases of the container flow planning and control system 110 may be either separate databases or some of all of the information contained in multiple databases may be contained in a single database.

A number of controllers each operatively interconnected to the processor unit 114 function to provide operational instructions via the network server 116 and the network 118 to each of the elements of the container terminal 112, including the quay cranes 70, the automated stacking cranes 48, the automated horizontal transports 68, and the ships incoming container database 136. A quay cranes controller 148 functions to provide operational instructions to the quay cranes 70. A quay-side terminal horizontal transports controller 150 functions to provide operational instructions to the automated horizontal transports 68 operating in the transfer lane 52 on the quay side of the yard blocks 42 (shown in FIG. 1).

An automated stacking cranes controller 152 functions to provide operational instructions to the automated stacking cranes 48. A land-side terminal horizontal transports controller 154 functions to provide operational instructions to the automated horizontal transports 68 operating in the queuing space 60 on the land side of the yard blocks 42 (shown in FIG. 1). A rail cranes controller 156 functions to provide operational instructions to the rail cranes 134.

A transit communication module 158 operatively interconnected to the processor unit 114 functions to relay communications from the container flow planning and control system 110 via the network server 116 and the network 118 to any operators in the container terminal 112, including truck communications 160 directing the movement of the trucks 62 in the container terminal 112. Finally, an automatic holistic scheduler 162 operatively interconnected to the processor unit 114 functions to control all flow planning and the various control system elements of the container flow planning and control system 110 shown in FIG. 9.

Figure 10:
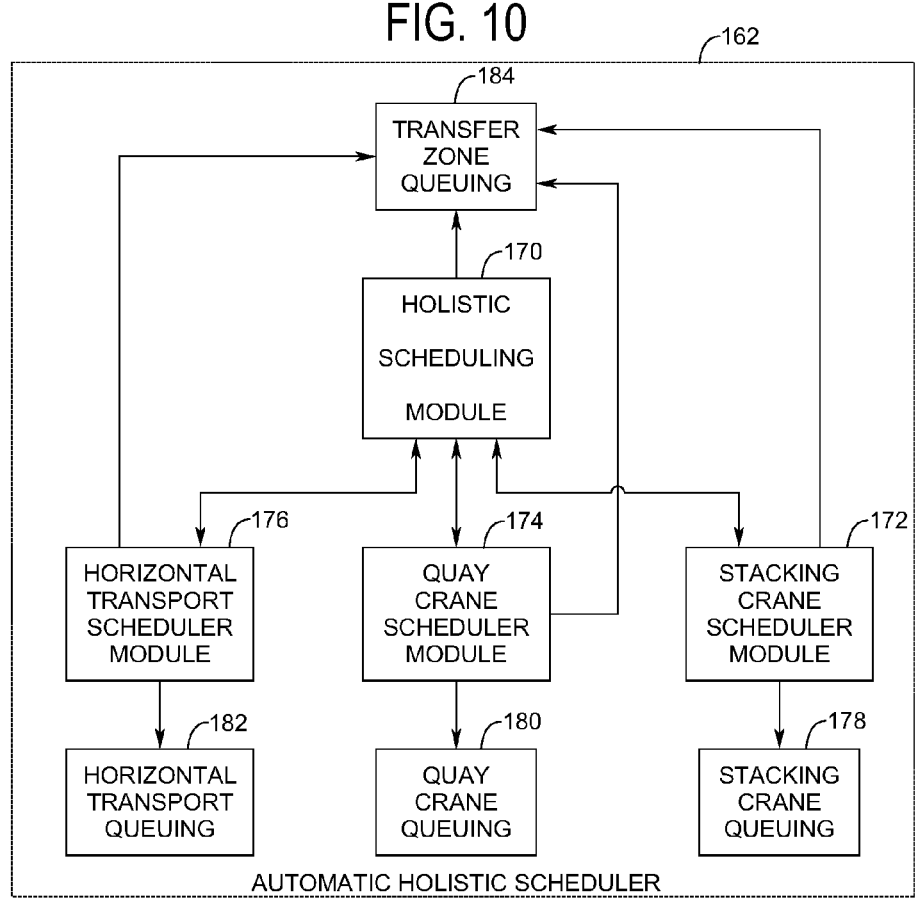
FIG. 10 is a somewhat schematic block diagram showing an overview of a holistic scheduling process that may be used by integral container terminal flow planning and control system shown in FIG. 9 to operate the shipping container transportation and storage terminal illustrated in FIGS. 1 through 8.

Referring now to FIG. 10, an overview of a holistic scheduling process that may be used by the automatic holistic scheduler 162 (shown in FIG. 9) for planning and implementing the operation of the flow of containers 46 in the container terminal 112 (also shown in FIG. 9). The heart of the automatic holistic scheduler 162 is a holistic scheduling module 170 which, as its name implies, plans (schedules) and controls (directs) all of the operations that are to be performed in the container terminal 112, as well as the particular timing of each of the operations. At least three controlled modules are used to control the principal different types of operations performed in the operation of the container terminal 112.

A stacking crane scheduler module 172 operatively connected to the holistic scheduling module 170 is used to implement the scheduling of the automated stacking cranes 48 (shown in FIG. 1). A quay crane scheduler module 174 operatively connected to the holistic scheduling module 170 is used to implement the scheduling of the quay cranes 70 (also shown in FIG. 1). A horizontal transport scheduler module 176 operatively connected to the holistic scheduling module 170 is used to implement the scheduling of the automated horizontal transports 68 (also shown in FIG. 1), as well as to coordinate the movement of the trucks 62 (also shown in FIG. 1), the trains 64 (also shown in FIG. 1), and the rail cranes 134 (shown in FIG. 9).

The stacking crane scheduler module 172 provides as its output a series of orders for the automated stacking cranes 48 that are shown in FIG. 10 as stacking crane queuing 178. The quay crane scheduler module 174 provides as its output a series of orders for the quay cranes 70 that are shown in FIG. 10 as quay crane queuing 180. The horizontal transport scheduler module 176 provides as its output a series of orders for the automated horizontal transports 68 (as well as for the trucks 62, the trains 64, and the rail cranes 134) that are shown in FIG. 10 as horizontal transport queuing 182.

In addition, the stacking crane scheduler module 172, the quay crane scheduler module 174, and the horizontal transport scheduler module 176 provide queuing information to supplement a series of orders provided by the holistic scheduling module 170 that are shown in FIG. 10 as transfer zone queuing 184. The transfer zone queuing 184 is provided by the holistic scheduling module 170 in a manner that holistically ensures that all of the movements of all of the elements of the container terminal 112 are performed in a manner such that there are no adverse interactions, as well as being performed in the most time-wise efficient manner possible.

Figure 11:
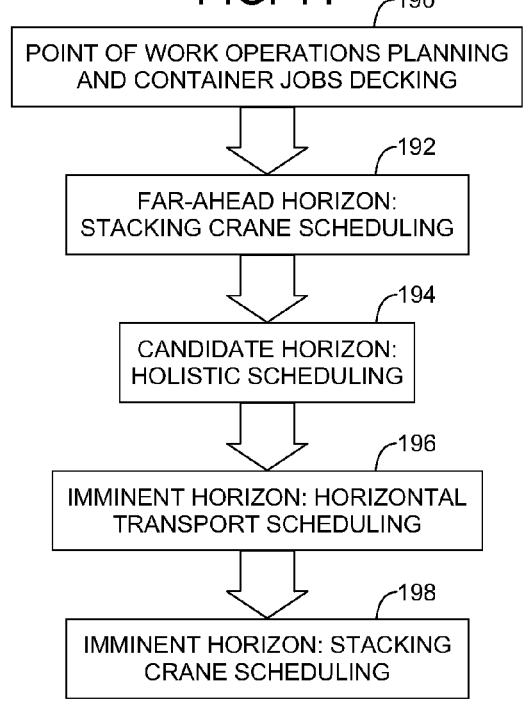
FIG. 11 is a high-level flowchart illustrating the concept behind the holistic scheduling performed by the automatic holistic scheduler of the integral container terminal flow planning and control system and method of the present invention illustrated in FIG. 1.

Referring next to FIG. 11, the principles governing the operation of the automatic holistic scheduler 162 of FIG. 10 are illustrated in graphic form as five process steps, four of which are scheduling process steps. The five process steps are generally shown in the time sequence in which they are performed, from the top process step which is performed the furthest ahead (or the longest time period in advance), and the bottom two process steps which are performed the least far head (or the shortest time in advance).

The first process step is a point of work operations planning and container jobs decking process 190. In this process step, initial ship and rail point-of-work operations (as well as initial consideration of anticipated road operations) are planned well in advance and container decking (the location and placement of containers 46 in the yard blocks 42) is also planned in advance. The point of work operations planning and container jobs decking process 190 is performed approximately one to approximately one and one-half hours in advance.

The next four steps are used to schedule operations in the container terminal 112 in three different time windows in advance, with the last two steps being used during approximately the same time window. The second process step is a far-ahead horizon stacking crane scheduling step 192 that is performed in a far-ahead horizon time window. In this process step, the operations of the automated stacking cranes 48 (shown in FIG. 1) and the rail cranes 134 (shown in FIG. 9) are planned to take advantage of potential housekeeping and advantageous moves that can be promoted. The far-ahead horizon stacking crane scheduling step 192 is performed in the far-ahead horizon time window approximately thirty minutes to approximately one hour in advance.

The third process step is a candidate horizon holistic scheduling step 194 that is performed in a candidate horizon time window. In this process step, consideration is given to all operations of the entire container terminal 112 taking into account the effects that each potential move has both on all other moves as well as on the overall efficient operation of the container terminal 112. The candidate horizon holistic scheduling step 194 is performed in the far-ahead horizon time window approximately ten minutes to approximately thirty minutes in advance.

The fourth process step is an imminent horizon horizontal transport scheduling step 196 that is performed in an imminent horizon time window. In this process step, operational scheduling and dispatch of the automated horizontal transports 68 (shown in FIG. 1) is planned in conjunction with the operations of the automated stacking cranes 48 (shown in FIG. 1) and the rail cranes 134 (shown in FIG. 9) which is simultaneously being scheduled in the fifth process step (as will become evident below). The imminent horizon horizontal transport scheduling step 196 is performed in an imminent horizon time window that is up to approximately ten minutes in advance.

The fifth process step is an imminent horizon stacking crane scheduling step 198 that is also performed in the imminent horizon time window. In this process step, operational scheduling and dispatch of the automated stacking cranes 48 (shown in FIG. 1) and the rail cranes 134 (shown in FIG. 9) is planned in conjunction with the operations of the automated horizontal transports 68 (shown in FIG. 1) which is simultaneously being scheduled in the imminent horizon horizontal transport scheduling step 196 as discussed above. As mentioned above, the imminent horizon stacking crane scheduling step 198 is performed in the imminent horizon time window that is up to approximately ten minutes in advance.

Figure 12:
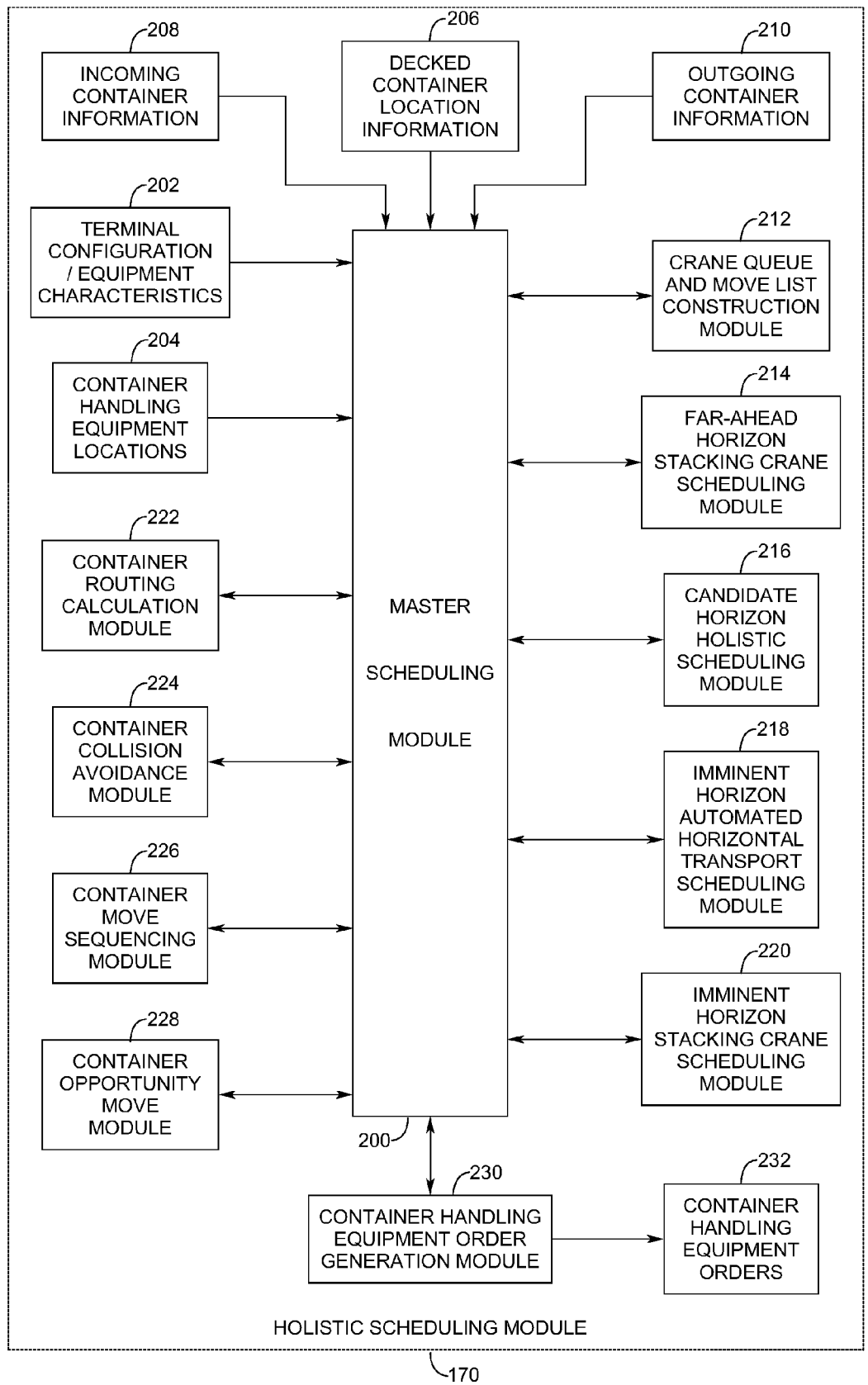
FIG. 12 is a somewhat schematic block diagram showing inputs to and exemplary components of the holistic scheduling module of the schematic block diagram illustrated in FIG. 10.

Referring now to FIG. 12, an exemplary block diagram of an implementation of the holistic scheduling module 170 of FIG. 11 is illustrated together with a number of inputs providing information upon which the operation of the container terminal 112 is based. A terminal configuration/equipment characteristics input 202 provides information relating to the configuration of the container terminal 112 and the characteristics of the container handling equipment in the container terminal 112, which may be obtained from the terminal configuration database 128 (shown in FIG. 1). A container handling equipment locations input 204 provides information relating to the locations of the container handling equipment in the container terminal 112, which may be obtained from the container location database 130 (shown in FIG. 1).

A decked container location information input 206 provides information relating to the locations of the containers 46 stored in the yard blocks 42 (shown in FIG. 1), which information may be obtained from the container location database 130 (shown in FIG. 1). An incoming container information input 208 provides information regarding containers 46 arriving at the container terminal 112 by ship 66, train 64, and truck 62, which may be obtained from the ships incoming container database 136, the rail incoming container database 140, and the truck incoming container database 144 (all of which are shown in FIG. 1). An outgoing container information input 210 provides information regarding containers 46 to be shipped from the container terminal 112 by ship 66, train 64, and truck 62, which may be obtained from the ships outgoing container database 138, the rail outgoing container database 142, and the truck outgoing container database 146 (all of which are shown in FIG. 1).

The five process steps discussed with reference to FIG. 11 are implemented using five modules in the holistic scheduling module 170, each of which modules is operatively interconnected to the master scheduling module 200. A crane queue and move list construction module 212 formulates initial ship, rail, and road point-of-work operations and container decking advance scheduling. A far-ahead horizon stacking crane scheduling module 214 formulates housekeeping and advantageous moves that can be promoted in the operations of the automated stacking cranes 48 (shown in FIG. 1) and the rail cranes 134 (shown in FIG. 9).

A candidate horizon holistic scheduling module 216 formulates potential moves for all elements of the entire container terminal 112 to enhance the overall advantageous and efficient operation of the container terminal 112. An imminent horizon automated horizontal transport scheduling module 218 formulates the scheduling and dispatch of the automated horizontal transports 68 (shown in FIG. 1) in conjunction with the simultaneous operations of the automated stacking cranes 48 (shown in FIG. 1) and the rail cranes 134 (shown in FIG. 9). An imminent horizon stacking crane scheduling module 220 formulates the scheduling and dispatch of the automated stacking cranes 48 (shown in FIG. 1) and the rail cranes 134 (shown in FIG. 9) in conjunction with the simultaneous operations of the automated horizontal transports 68 (shown in FIG. 1).

Five additional modules provide additional enhancements as well as the operational instructions for all of the equipment of the container terminal 112, each of which modules is also operatively interconnected to the master scheduling module 200. A container routing calculation module 222 formulates efficient and properly timed moves for each container 46 in the container terminal 112. A container collision avoidance module 224 ensures that none of the moves of the equipment in the container terminal 112 can cause a collision of different pieces of the equipment.

A container move sequencing module 226 ensures the proper sequencing of loading of the containers 46 onto ships 66, trains 64, and trucks 62. A container opportunity move module 228 functions to take advantage of idle equipment resources to advance the movement of containers 46 toward their ultimate disposition. Finally, a container handling equipment order generation module 230 generates container handling equipment instructions 232 to operate the various equipment controllers, including the quay cranes controller 148, the quay-side terminal horizontal transports controller 150, the automated stacking cranes controller 152, the land-side terminal horizontal transports controller 154, the rail cranes controller 156, and the transit communication module 158 (all shown in FIG. 9).

Figure 13:
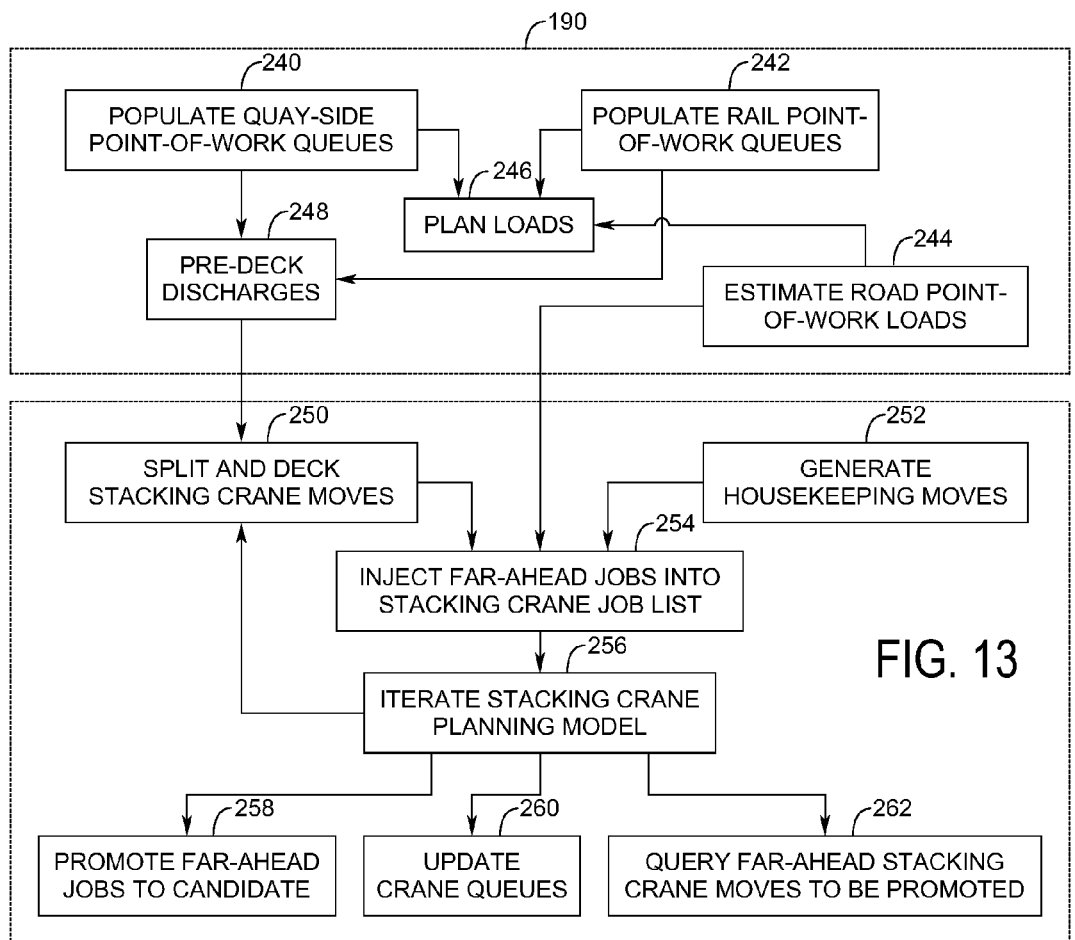
FIG. 13 is a more detailed flowchart illustrating exemplary operations performed by the far-ahead horizon stacking crane scheduling step and the point of work operations planning and container jobs decking step of the high-level flowchart illustrated in FIG. 11.

Referring next to FIG. 13, expanded details of exemplary steps performed within the point of work operations planning and container jobs decking process 190 and the far-ahead horizon stacking crane scheduling step 192 of FIG. 11 are shown. The point of work operations planning and container jobs decking process 190 has five such exemplary steps shown. A populate quay-side point-of-work queues step 240, a populate rail point-of-work queues step 242, and an estimate road point-of-work loads 244 plan initial queues and begin the construction of work orders to move containers 46 for quay-side container moves, land-side container moves to or from trains, and land-side container moves to or from trucks, respectively.

Based upon the populate quay-side point-of-work queues step 240, the populate rail point-of-work queues step 242, and the estimate road point-of-work loads 244, loads are initially planned in a plan loads step 246. Based upon ships 66 and trains 64 arriving or schedule to arrive in the next approximately one to approximately one and one-half hours, movements of containers 46 prior to being placed in the yard blocks 42 (shown in FIG. 1) are planned in a pre-deck discharges step 248. This completes the point of work operations planning and container jobs decking process 190, which is performed approximately one to approximately one and one-half hours in advance.

The far-ahead horizon stacking crane scheduling step 192 has seven such exemplary steps shown. Based upon planned movements of containers 46 from the pre-deck discharges step 248 in the point of work operations planning and container jobs decking process 190, split and deck stacking crane moves are planned in a split and deck stacking crane moves step 250. Based upon any anticipated surplus of resources, potential housekeeping moves are planned in a generate housekeeping moves step 252. Information from the split and deck stacking crane moves step 250 and the generate housekeeping moves step 252 as well as from the estimate road point-of-work loads 244 in the point of work operations planning and container jobs decking process 190 is used to plan far-ahead jobs for the automated stacking cranes 48 (shown in FIG. 1) in an inject far-ahead jobs into stacking crane jobs list step 254.

In response to information from the inject far-ahead jobs into stacking crane jobs list step 254, stacking crane moves are iterated in an iterate stacking crane planning model step 256, and provided as feedback to the split and deck stacking crane moves step 250. The stacking crane moves provided by the inject far-ahead jobs into stacking crane jobs list step 254 are also provided to a promote far-ahead jobs to candidate step 258 in which moves are provided to be performed, an update crane queues list step 260 that generates an ordered queue of moves, and a query far-ahead stacking crane moves to be promoted step 262 that in which underutilized resources are utilized by promoting crane opportunity moves. This completes the far-ahead horizon stacking crane scheduling step 192, which is performed approximately thirty minutes to approximately one hour in advance.

Figure 14:
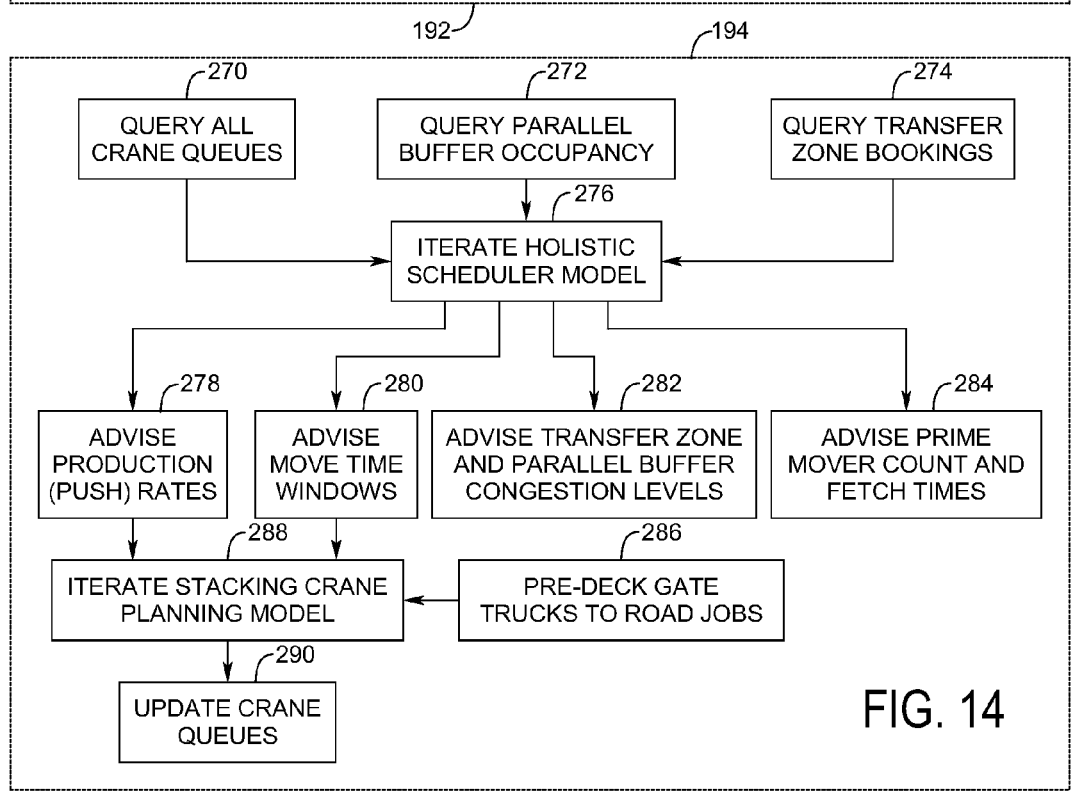
FIG. 14 is a more detailed flowchart illustrating exemplary operations performed by the candidate horizon holistic scheduling step of the high-level flowchart illustrated in FIG. 11.

Referring now to FIG. 14, expanded details of exemplary steps performed within the candidate horizon holistic scheduling step 194 of FIG. 11 are shown. The candidate horizon holistic scheduling step 194 has eleven such exemplary steps, beginning with three steps in which long term move information generated in the point of work operations planning and container jobs decking process 190 and the far-ahead horizon stacking crane scheduling step 192 is utilized. Crane queue information obtained in a query all crane queues step 270, information regarding multiple moves scheduled to be made simultaneously is obtained in a query parallel buffer occupancy step 272, and information regarding moves scheduled to be made in the transfer lane 52 (shown in FIG. 1) and the queuing space 60 (also shown in FIG. 1) obtained in a query transfer zone bookings step 274 is provided to an iterate holistic scheduler model step 276 that holistically computes scheduled moves for the container terminal 112.

This holistic move schedule information is provided to an advise production (push) rates step 278 that provides information regarding the pace of anticipated moves, an advise move time windows step 280 that provides information regarding windows for anticipated moves, an advise transfer zone and parallel buffer congestion levels step 282 that provides information regarding simultaneous anticipated moves, and an advise prime mover count and fetch times step 284 that provides information regarding prime mover equipment availability timing in view of anticipated moves.

Additionally, a pre-deck gate trucks to road jobs step 286 provides information regarding planned movements of containers 46 in trucks 62 (shown in FIG. 1) through the gates 72 (also shown in FIG. 1). The information provided from the advise production (push) rates step 278, the advise move time windows step 280, the advise transfer zone and parallel buffer congestion levels step 282, the advise prime mover count and fetch times step 284, and the pre-deck gate trucks to road jobs step 286 is provided to an iterate stacking crane planning model 288, which generates updated crane queues in an update crane queues step 290 for the operation of the stacking cranes. The candidate horizon holistic scheduling step 194 is performed approximately ten minutes to approximately thirty minutes in advance.

Figure 15:
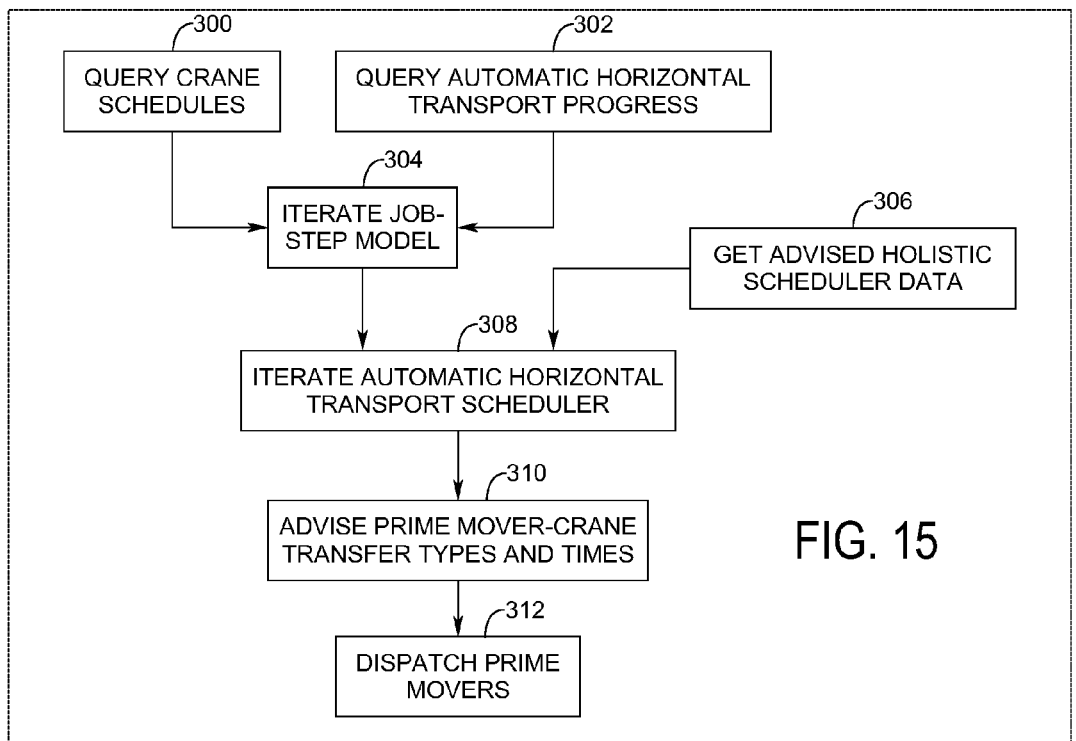
FIG. 15 is a more detailed flowchart illustrating exemplary operations performed by the imminent horizon horizontal transport scheduling step of the high-level flowchart illustrated in FIG. 11.

Referring next to FIG. 15, expanded details of exemplary steps performed within the imminent horizon horizontal transport scheduling step 196 of FIG. 11 are shown. The imminent horizon horizontal transport scheduling step 196 has seven such exemplary steps, beginning with two steps in which queue and status information generated in the candidate horizon holistic scheduling step 194 is utilized. Crane schedule information obtained in a query crane schedules step 300 and information regarding the current progress of automatic horizontal transports is obtained in a query automatic horizontal transport progress step 302 is provided to an iterate holistic scheduler model step 276 that holistically computes scheduled moves for movements of the automated horizontal transports 68 (shown in FIG. 1) in the container terminal 112, with this information being provided to an iterate job step model step 304 in which the movements of the automated horizontal transports 68 are provided.

This information from the iterate job step model step 304 and information regarding the holistic schedules provided by a get advised holistic scheduler data step 306 are provided to an iterate automatic horizontal transport scheduler step 308 that generates the schedule for all of the automated horizontal transports 68 (shown in FIG. 1). This information is provided to an advise prime mover crane transfer types and times step 310 that initiates automated horizontal transports operations in a dispatch prime movers step 312. The imminent horizon horizontal transport scheduling step 196 is performed in an imminent horizon time window that is performed up to approximately ten minutes in advance.

Figure 16:
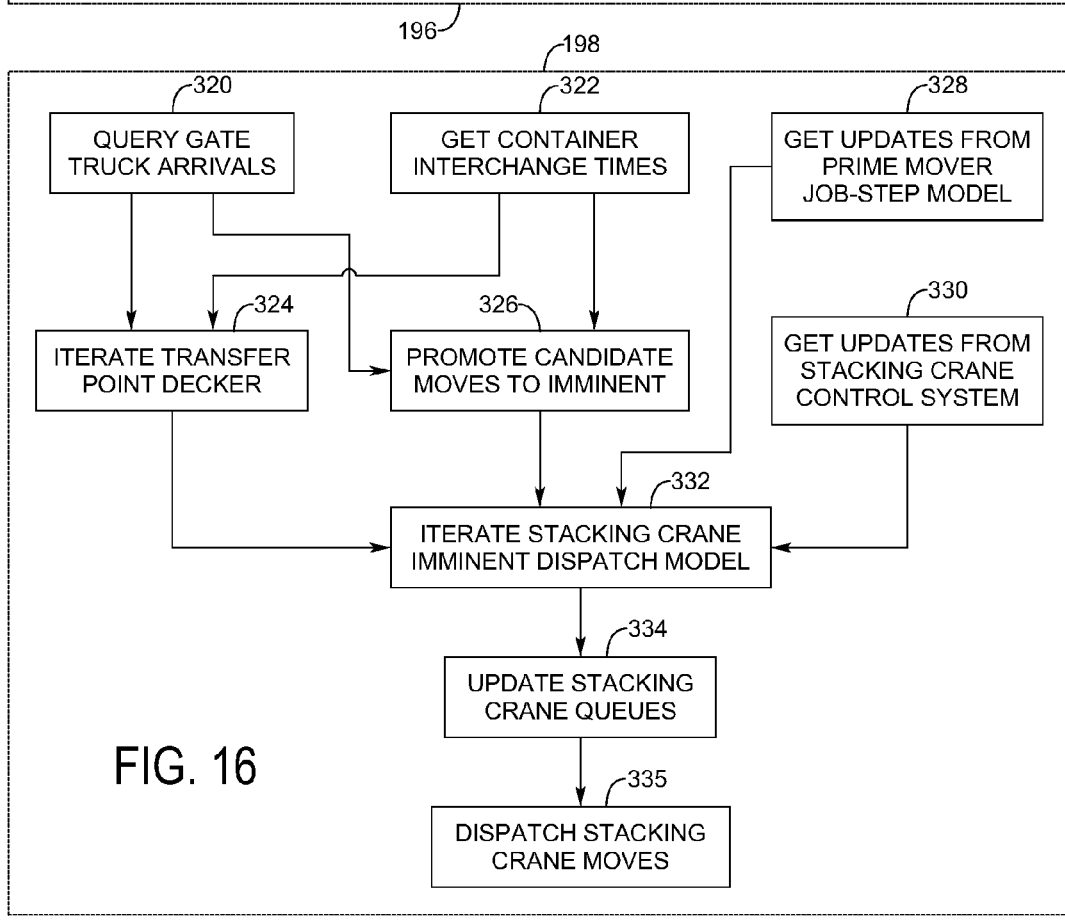
FIG. 16 is a more detailed flowchart illustrating exemplary operations performed by the imminent horizon stacking crane scheduling step of the high-level flowchart illustrated in FIG. 11.

Referring finally to FIG. 16, expanded details of exemplary steps performed within the imminent horizon stacking crane scheduling step 198 of FIG. 11 that is performed simultaneously with the imminent horizon horizontal transport scheduling step 196 are shown. The imminent horizon stacking crane scheduling step 198 has nine such exemplary steps, beginning with two steps, a query gate truck arrivals step 320 and a get container interchange times step 322, in which truck arrival information and container interchange information generated in the candidate horizon holistic scheduling step 194, respectively, are utilized. The information generated in the query gate truck arrivals step 320 and the get container interchange times step 322 is provided to both an iterate transfer point decker step 324, which generates transfers to, from, and within the yard blocks 42 (shown in FIG. 1), and a promote candidate moves to imminent step 326, which holistically planned moves of containers 46 to a sequence of crane moves to be performed shortly.

Information generated by the iterate transfer point decker step 324 and the promote candidate moves to imminent step 326, together with information generated by a get updates from prime mover job-step model step 328, which obtains information from the imminent horizon horizontal transport scheduling step 196, and by a get updates from stacking crane control system step 330, which regarding the current progress of the holistic stacking crane schedules.

Information from the iterate transfer point decker step 324, the promote candidate moves to imminent step 326, the get updates from prime mover job-step model step 328, and the get updates from stacking crane control system step 330 are provided to an iterate stacking crane imminent dispatch model step 332 that generates the schedule for all of the stacking cranes. This information is provided to an update stacking crane queues step 334 that initiates dispatching stacking crane moves step 336 that implements the operation of the cranes. The imminent horizon stacking crane scheduling step 198 is performed in an imminent horizon time window that is performed up to approximately ten minutes in advance.

It may therefore be appreciated from the above detailed description of the preferred embodiment of the present invention that it provides a system and method to automatically plan and control of container flow operations in a container terminal. The integral container terminal flow planning and control system and method of the present invention does so holistically in a plurality of time periods prior to the actual execution of container moves. Finally, the integral container terminal flow planning and control system and method of the present invention achieves numerous advantages without incurring any substantial relative disadvantage.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be claimed alone or in combination with any of the features, elements, or components of any of the other embodiments discussed above.

What is claimed is:

1. A system for planning and controlling container flow operations in a container terminal of the type having:
    at least one yard block adapted to store containers, each yard block extending between a quay side of the yard block and a land transport side of the yard block;
    two automated stacking cranes per each yard block on rails adapted to allow the automated stacking cranes to travel between the quay side and the land transport side of each yard block, the automated stacking cranes adapted to transport containers between the quay side and the land transport side of each yard block and to store containers in each yard block;
    at least one quay crane adapted to transfer containers onto and off of a ship; and
    a plurality of automated vehicles adapted to transport containers between the quay side of the at least one yard block and the quay crane and between the land transport side of the at least one yard block and rail transport;
    wherein the planning and controlling system comprises:
        at least one processor device;
        a first database adapted to store information relating to an identity and a location of each of the containers stored in the at least one yard block;
        a second database adapted to store information relating to containers arriving at the container terminal;
        a third database adapted to store information relating to containers departing from the container terminal;
        an automatic holistic scheduler operatively connected to and adapted to obtain information from the first, second, and third databases, the automatic holistic scheduler also being adapted to direct sequential operations of each quay crane to transfer containers onto and off of a ship, to direct sequential operations of the stacking cranes to transport containers between the quay side and the land transport side of each yard block and to store containers in the at least one yard block, and to direct sequential operations of the automated vehicles to transport containers between the quay side of the at least one yard block and the quay crane and between the land transport side of the at least one yard block and rail transport;
    wherein the automatic holistic scheduler is arranged to automatically schedule operations of the container terminal in at least three different time windows in advance including, in order from longest time window to shortest time window:
        a first group of operations in a far-ahead horizon time window;

a second group of operations in a candidate horizon time window; and a third group of operations in an imminent horizon time window; and wherein the at least one processor device is operatively connected to at least one of the first database, the second database, the third database, and the automatic holistic scheduler.

2. A system as defined in claim 1, additionally comprising:

a terminal configuration database adapted to store information relating to at least one of the configuration of the container terminal and/or the stacking cranes, the quay cranes, and the automated vehicles.

3. A system as defined in claim 1, wherein said second database comprises:

a ships incoming container database adapted to store information relating to containers coming in on ships;

a rail incoming container database adapted to store information relating to containers coming in on trains; and a truck incoming container database adapted to store information relating to containers coming in on trucks.

4. A system as defined in claim 1, wherein said third database comprises:

a ships outgoing container database adapted to store information relating to containers going out on ships;

a rail outgoing container database adapted to store information relating to containers going out on trains; and a truck outgoing container database adapted to store information relating to containers going out on trucks.

5. A system as defined in claim 1, wherein the automatic holistic scheduler comprises:

a quay crane scheduler module arranged to direct sequential operations of each quay crane to transfer containers onto and off of a waterborne vessel;

a stacking crane scheduler module arranged to direct sequential operations of the stacking cranes to transport containers between the quay side and the land transport side of each yard block and to store containers in the at least one yard block;

a horizontal transport scheduler module arranged to direct sequential operations of the automated vehicles to transport containers between the quay side of the at least one yard block and the quay crane and between the land transport side of the at least one yard block and truck and/or rail transport; and a holistic scheduling module operatively connected to and adapted to obtain information from the first, second, and third databases, the holistic scheduling module also being adapted to direct the operations of the quay crane scheduler module, the stacking crane scheduler module, and the horizontal transport scheduler module.

6. A system as defined in claim 5, wherein the quay crane scheduler module is adapted to provide as an output a queued series of orders for the at least one quay crane; and wherein the stacking crane scheduler module is adapted to provide as an output a queued series of orders for the automated stacking cranes; and wherein the horizontal transport scheduler module is adapted to provide as an output a queued series of orders for the automated vehicles.

7. A system as defined in claim 6, wherein the holistic scheduling module, in conjunction with the quay crane scheduler module, the stacking crane scheduler module, and the horizontal transport scheduler module provides as an output a queued series of orders for transfer zone queuing.

8. A system as defined in claim 1, wherein the automatic holistic scheduler comprises:

a far-ahead horizon stacking crane scheduling module adapted to formulate housekeeping and advantageous moves in the operations of the automated stacking cranes during the far-ahead horizon time window;

a candidate horizon holistic scheduling module adapted to formulate potential moves of the automated stacking cranes, the at least one quay crane, and/or the automated vehicles during the candidate horizon time window;

an imminent horizon automated horizontal transport scheduling module adapted to formulate the scheduling and dispatch of the automated horizontal transports during the imminent horizon time window; and an imminent horizon stacking crane scheduling module adapted to formulate the scheduling and dispatch of the automated stacking cranes during the imminent horizon time window.

9. A system as defined in claim 8, additionally comprising an optional group of operations occurring longer in advance than the far-ahead time window;

wherein the automatic holistic scheduler additionally comprises:

a crane queue and move list construction module adapted to formulate initial ship, rail, and/or road point-of-work operations and container decking advance scheduling.

10. A system as defined in claim 1, wherein the far-ahead horizon time window, the candidate horizon time window, and the imminent horizon time window are unique and contiguous.

11. A system as defined in claim 1, wherein the far-ahead horizon time window is at least approximately 30 minutes ahead, wherein the imminent horizon time window is not more than approximately 10 minutes ahead, and the candidate horizon time window is between the far-ahead horizon time window and the imminent horizon time window.

12. A system as defined in claim 11, wherein the far-ahead horizon time window is between approximately 30 minutes ahead and approximately one hour ahead, wherein the candidate horizon time window is between ten minutes ahead and 30 minutes ahead, and wherein the imminent horizon time window is between approximately zero minutes ahead and approximately ten minutes ahead.

13. A system as defined in claim 11, additionally comprising an optional group of operations occurring longer in advance than the far-ahead time window;

wherein the optional group of operations occurs between one hour ahead and 90 minutes ahead.

14. A system for planning and controlling container flow operations in a container terminal of the type having:

at least one yard block adapted to store containers, each yard block extending between a quay side of the yard block and a land transport side of the yard block;

two automated stacking cranes per each yard block on rails adapted to allow the automated stacking cranes to travel between the quay side and the land transport side of each yard block, the automated stacking cranes adapted to transport containers between the quay side and the land transport side of each yard block and to store containers in each yard block;

at least one quay crane adapted to transfer containers onto and off of a ship; and a plurality of automated vehicles adapted to transport containers between the quay side of the at least one yard block and the quay crane and between the land transport side of the at least one yard block and rail transport;

wherein the planning and controlling system comprises:

at least one processor device;

a first database adapted to store information relating to an identity and a location of each of the containers stored in the at least one yard block;
a second database adapted to store information relating to containers arriving at the container terminal;
a third database adapted to store information relating to containers departing from the container terminal;
a quay crane scheduling module arranged to direct sequential operations of each quay crane to transfer containers onto and off of a ship;
a stacking crane scheduling module arranged to direct sequential operations of the stacking cranes to transport containers between the quay side and the land transport side of each yard block and to store containers in the at least one yard block;
a horizontal transport scheduling module arranged to direct sequential operations of the automated vehicles to transport containers between the quay side of the at least one yard block and the quay crane and between the land transport side of the at least one yard block and rail transport;
a holistic scheduling module operatively connected to and adapted to obtain information from the first, second, and third databases, the holistic scheduling module also being adapted to direct the operations of the quay crane scheduling module, the stacking crane scheduling module, and the horizontal transport scheduling module;
wherein the holistic scheduling module is arranged to automatically schedule operations of the container terminal in at least three different time windows in advance including, in order from longest time window to shortest time window:
a first group of operations in a far-ahead horizon time window;
a second group of operations in a candidate horizon time window; and
a third group of operations in an imminent horizon time window; and
wherein the at least one processor device is operatively connected to at least one of the first database, the second database, the third database, the quay crane scheduling module, the stacking crane scheduling module, the horizontal transport scheduling module, and the holistic scheduling module.

15. A system for planning and controlling container flow operations in a container terminal of the type having:
a yard block adapted to store containers, the yard block extending between a quay side of the yard block and a land transport side of the yard block;
two automated stacking cranes on rails adapted to allow the automated stacking cranes to travel between the quay side and the land transport side of each yard block and to transport containers between the quay side and the land transport side of the yard block and to store containers in the yard block;
a quay crane adapted to transfer containers onto and off of a ship; and
automated vehicles adapted to transport containers between the quay side of the yard block and the quay crane and between the land transport side of the yard block and rail transport;
wherein the planning and controlling system comprises:
a processor device;
at least one database adapted to store information relating to an identity and a location of each of the containers stored in the at least one yard block, information relating to containers arriving at the container terminal, and information relating to containers departing from the container terminal; and
an automatic holistic scheduler adapted to direct sequential operations of the quay crane to transfer containers onto and off of a ship, the stacking cranes to transport containers between the quay side and the land transport side of the yard block and to store containers in the yard block, and the automated vehicles to transport containers between the quay side of the yard block and the quay crane and between the land transport side of the yard block and rail transport, wherein the automatic holistic scheduler is operatively connected to the first, second, and third databases; and
wherein the automatic holistic scheduler is adapted to automatically schedule operations of the container terminal in at least three time windows; and
wherein the processor device is operatively connected to at least one of the first database, the second database, the third database, and the automatic holistic scheduler.

16. A method of planning and controlling of container flow operations in a container terminal, comprising:
storing information relating to an identity and a location of each of a plurality of containers stored in at least one yard block in a first database, wherein the at least one yard block is adapted to store containers, and wherein each yard block extends between a quay side of the yard block and a land transport side of the yard block;
storing information relating to containers arriving at the container terminal in a second database;
storing information relating to containers departing from the container terminal in a third database;
directing sequential operations of at least one quay crane to transfer containers onto and off of a waterborne vessel with a quay crane scheduling module, wherein each quay crane is adapted to transfer containers onto and off of a ship;
directing sequential operations of a plurality of stacking cranes to transport containers between the quay side and the land transport side of each yard block and to store containers in the at least one yard block with a stacking crane scheduling module, wherein each yard block has two automated stacking cranes on rails adapted to allow the automated stacking cranes to travel between the quay side and the land transport side of each yard block, and wherein the automated stacking cranes are adapted to transport containers between the quay side and the land transport side of each yard block and to store containers in each yard block;
directing sequential operations of a plurality of automated vehicles adapted to transport containers between the quay side of the at least one yard block and the quay crane and between the land transport side of the at least one yard block and rail transport with a horizontal transport scheduling module;
obtaining information from the first, second, and third databases and directing the operations of the quay crane scheduling module, the stacking crane scheduling module, and the horizontal transport scheduling module with a holistic scheduling module;
automatically scheduling operations of the container terminal in at least three different time windows in advance including, in order from longest time window to shortest time window:
a first group of operations in a far-ahead horizon time window;

a second group of operations in a candidate horizon time window; and a third group of operations in an imminent horizon time window; and wherein at least one processor device is operatively connected to at least one of the first database, the second database, the third database, the quay crane scheduling module, the stacking crane scheduling module, the horizontal transport scheduling module, and the holistic scheduling module.

17. A method as defined in claim 16, wherein the step of directing the operations of the quay crane scheduling module, the stacking crane scheduling module, and the horizontal transport scheduling module with a holistic scheduling module comprises:

formulating housekeeping and advantageous moves in the operations of the automated stacking cranes during the far-ahead horizon time window;

formulating potential moves of the automated stacking cranes, the at least one quay crane, and/or the automated vehicles during the candidate horizon time window;

formulating the scheduling and dispatch of the automated horizontal transports during the imminent horizon time window; and formulating the scheduling and dispatch of the automated stacking cranes during the imminent horizon time window.

18. A method as defined in claim 16, wherein the far-ahead horizon time window, the candidate horizon time window, and the imminent horizon time window are unique and contiguous.

19. A method as defined in claim 16, wherein the far-ahead horizon time window is at least approximately 30 minutes ahead, wherein the imminent horizon time window is not more than approximately 10 minutes ahead, and the candidate horizon time window is between the far-ahead horizon time window and the imminent horizon time window.

20. A method as defined in claim 19, additionally comprising scheduling an optional group of operations occurring longer in advance than the far-ahead time window;

wherein the optional group of operations occurs between one hour ahead and 90 minutes ahead.

* * * * *